US008645183B2

(12) United States Patent
Shin et al.

(10) Patent No.: US 8,645,183 B2
(45) Date of Patent: Feb. 4, 2014

(54) SYSTEM FOR ASSESSING AN ENVIRONMENTAL LOAD OF BUILDING DURING LIFE CYCLE

(75) Inventors: Sung Woo Shin, Seoul (KR); Han Seung Lee, Ansan-si (KR); Sung Ho Tae, Ansan-si (KR); Dae Won Kim, Seoul (KR); Young Jun Park, Seoul (KR); Jung Soo Byun, Yongin-si (KR); Jang Ho An, Seoul (KR); Joo Ho Lee, Seoul (KR); Jun Seo Lee, Seoul (KR)

(73) Assignees: Industry—University Cooperation Foundation Hanyang University Erica Campus (KR); Lotte Engineering & Construction Co. Ltd. (KR)

( * ) Notice: Subject to any disclaimer, the term of this patent is extended or adjusted under 35 U.S.C. 154(b) by 0 days.

(21) Appl. No.: 13/110,261

(22) Filed: May 18, 2011

(65) Prior Publication Data
US 2013/0090972 A1 Apr. 11, 2013

(30) Foreign Application Priority Data

Jan. 17, 2011 (KR) .................. 10-2011-0004344
May 2, 2011 (KR) .................. 10-2011-0041512

(51) Int. Cl.
*G06Q 10/00* (2012.01)
(52) U.S. Cl.
USPC .......................................... 705/7.23; 702/84
(58) Field of Classification Search
None
See application file for complete search history.

(56) References Cited

U.S. PATENT DOCUMENTS 7,835,812 B2 * 11/2010 Hotta et al. ..................... 700/99
2006/0111876 A1 * 5/2006 Ichikawa et al. .............. 702/189

FOREIGN PATENT DOCUMENTS

JP       2000027458 A  *  1/2000
JP       2004265178 A  *  9/2004

OTHER PUBLICATIONS

Kofoworola, Oyeshola, Environmental life cycle assessment of a commercial office building in Thailand, May 21, 2008, International Journal of Life Cycle Assessment, vol. 13, pp. 498-511.*

* cited by examiner

*Primary Examiner* — Peter Choi
*Assistant Examiner* — Alan Torrico-Lopez
(74) *Attorney, Agent, or Firm* — John K. Park; Park Law Firm

(57) ABSTRACT

The present invention relates to an environmental load assessment system, which is capable of efficiently and simply assessing an environmental load of a building in all stages (e.g., a planning stage, a design stage, a construction stage, and a use stage after construction) in doing executing a business by subdividing an assessment process, such as simple assessment in the design stage, detailed assessment in the start stage, and site assessment in the construction stage according to the progress of a construction project. The system of the present invention includes a DB server for storing material information, environmental load information, and itemized material information about a construction work and storing environmental load information about an energy source; a management server for assessing environmental loads based on simple assessment, a detailed assessment, and site assessment according to the progress of a target assessment construction project; and a UI server for providing user terminals with an execution environment so that the management server can be operated.

7 Claims, 41 Drawing Sheets

Fig. 4C

| Simple Assessment | Detailed Assessment | Site Assessment | Assessment Analysis | Assessment LIST | Notice List | Admin mode |
|---|---|---|---|---|---|---|

Optional Info. Input

| Simple Assessment | | | | | | | | | |
|---|---|---|---|---|---|---|---|---|---|
| Design Info. Basic Info. Optional Info. | • New Generation Energy | | Standard | | | | Assessment | | |
| | | Solar Energy | Usage(KWP) | Uptime(H) | Life(Y) | Usage(KWP) | Uptime(H) | Life(Y) | |
| | | | 20 | 2.3 | 60 | 20 | 2.3 | 60 | |
| | • Housing Unit | NO. | Use | Bldg. Name | Ground Floor Number | Structure Form | | | |
| | | 1 | Apt. house | 101 | 15 | Box Frame | | | |
| | • Attached Unit | NO. | Use | Name | | Floor Number | | | |
| | | ☐ | Community Institution | Shopping Center | | 2 | | | |
| | | Select & Delete | Building Add | | | | | | |
| Const. stage Prod. stage Work. stage | • Underground Parking Lot | NO. | Use | Name | | Floor Number | | | |
| | | ☐ | Parking Lot | Underground Parking Lot | | 1 | | | |
| Operat. stage | | | | | | | | | |
| Maint. stage | Back | Next | | | | | | | |
| Demolition. stage | | | | | | | | | |
| Assessment result LCE assessment LCCO² assessment Overall assessment | | | | | | | | | |

• Typical Floor Setting

[401] Detailed Info. Input ⓧ

| | TYPE | Household Number | |
|---|---|---|---|
| ☐ | 28 | 0 | |
| ☐ | | | |

Structure Form | Box Frame ▼ | Unit Form | Flat type ▼

| Household Number | Floor Height | Wall ratio |
|---|---|---|
| 6 | 2.9 | 50 |

Cancel | Confirm

Save

Fig. 4D

| Simple Assessment | Detailed Assessment | Site Assessment | Assessment Analysis | | Assessment LIST | Notice List | Admin mode |
|---|---|---|---|---|---|---|---|
| Simple Assessment | | | | | | | |
| Design Info. | Prod. Stage | | | | | | |
| Basic Info. | Ground floor | Attached floor | Underground parking lot | Public works /Landscaping | | | |
| Optional Info. | | | | Building Name | 401 ▼ | | |
| Const. stage | ▪ Structure | | | | | | |
| Prod. stage | Concrete | | | | | | |
| Work. stage | TYPE | Strength | Composition | Energy consumption(MJ) | CO₂ emissions (Kg- Co₂) | | |
| | General | 21MPa | Non Mixing | 776805.7364 | 59838.6806 | | |
| | Item Add | | | | | | |
| | Rebar | | | | | | |
| Operat. stage | TYPE | Composition | | Energy consumption(MJ) | CO₂ emissions (Kg- Co₂) | | |
| | General | SD30A | | 501493.0364 | 5477.2119 | | |
| Maint. stage | Item Add | | | | | | |
| | Mold | | | | | | |
| Demolition. stage | TYPE | Ratio | Composition | Energy consumption(MJ) | CO₂ emissions (Kg- Co₂) | | |
| Assessment result | Plywood | 42% | Plywood | | | | |
| LCE assessment | ▪ *Exterior material* | | | | | | |
| LCCO² assessment | ▪ *Interior material* | | | | | | |
| Overall assessment | Back | | Next | | | Save | |

Fig. 4F

| Simple Assessment | Detailed Assessment | Site Assessment | Assessment Analysis | | Assessment LIST | Assessment List | Notice List | Admin mode |

Simple Assessment

Design Info.
Basic Info.
Optional Info.

- Heating method Select   Assessment [Each heating method (Oil) ▼]
  ○ Estimation model method  ○ Direct input method building  ○ Energy efficiency rating method

| | Energy Source | Unit | Energy Consumption (MJ/m²) | $CO_2$ Emissions (Kg-$Co_2$/m²) |
|---|---|---|---|---|
| | | | Assessment | Assessment |
| ☐ | Briquette | kg | 146.25 | 13.91 |
| ☐ | Kerosene | ℓ | 15016.61 | 996.07 |
| ☐ | Electricity | Kwh | 16623.9 | 821.96 |
| | | Total | 35403.51 | 2039.05 |

[Select & Delete] [Energy Source Add]

Const. stage
 Prod. stage
 Work. stage

[Back]  [Next]                                   [Save]

Operat. stage

Maint. stage

Demolition. stage

Assessment result
 LCE assessment
 $LCO^2$ assessment
 Overall assessment

Fig. 4G

| | | Simple Assessment | Detailed Assessment | Site Assessment | Assessment Analysis | Assessment LIST | Notice List | Admin mode |
|---|---|---|---|---|---|---|---|---|
| Simple assessment | | | | | | | | |
| Design Info. | Basic Info. | | | | | | | |
| | Optional Info. | | | | | | | |
| Const. stage | Prod. stage | | | | | | | |
| | Work. stage | | | | | | | |
| Operat. stage | | | | | | | | |
| Maint. stage | | | | | | | | |
| Demolition. stage | | | | | | | | |
| Assessment result | | | | | | | | |
| LCE assessment | | | | | | | | |
| LCCO² assessment | | | | | | | | |
| Overall assessment | | | | | | | | |

Maint. stage

| | Code | Goods Name | Energy consumption (MJ/m²) | CO₂ emissions (Kg-Co₂/m²) |
|---|---|---|---|---|
| ☐ | | SD30A | 54244.83 | 592.45 |
| ☐ | | SD35 | 152023.73 | 166.37 |
| ☐ | | Silicon Paint | 711312.39 | 51966.58 |
| ☐ | | EPS | 1346063.63 | 89919.99 |
| ☐ | | Granite | 406764.29 | 29167.21 |
| | | Total | 2714975.46 | 175611.12 |

Select & Delete

Back    Next    Save

Fig. 4H

| Simple Assessment | Detailed Assessment | Site Assessment | Assessment Analysis | Assessment LIST | Notice List | Admin mode |
|---|---|---|---|---|---|---|

Simple Assessment

Demolition. stage

- Amount of Wastes Calculation

| | | Assessment | | |
|---|---|---|---|---|
| Amount of Wastes (Ton) | Concrete | Metal | The others | Total |
| | 455777.68 | 17753.79 | 49186.74 | 522718.21 |

- Building Disposal Process

| | | Assessment | |
|---|---|---|---|
| Disposal equipment | Backhoe(0.4m3)+Breaker(0.4m3) ▼ | | 4.76 l/ton |

- Waste transport Process

| | | Assessment | |
|---|---|---|---|
| Waste transport vehicles Select | 20ton dump truck ▼ | | 11.2 l/ton |

- Waste burial Process

| | | Assessment | |
|---|---|---|---|
| Waste burial | Dozer(D8N15PL.6PL)+Compator(32ton) ▼ | | 0.15 l/ton |

- Assessment result

| | E. Source | Unit | Energy consumption (MJ/m²) | CO₂ emissions (Kg-Co₂/m²) |
|---|---|---|---|---|
| | | | Assessment | Assessment |
| Bldg. Dispo.Process | Diesel | ℓ | 324.01 | 22.17 |
| Total | | | 510.07 | 34.9 |

Design Info. Basic Info. Optional Info.
Const. stage Prod. stage Work. stage
Operat. stage
Maint. stage
Demolition stage
Assessment result
LCE assessment
LCCO² assessment
Overall assessment

[Back] [Next]     [Save]

Fig. 4I

| Simple Assessment | Detailed Assessment | Site Assessment | Assessment Analysis | | Assessment LIST | Notice List | Admin mode |
|---|---|---|---|---|---|---|---|

Simple Assessment

• Overall Assessment

• Building Outline

| | Project Name | | Plottage | |
|---|---|---|---|---|
| Design Info. | | | | |
| Basic Info. | Site Location | | Bldg. area | |
| Optional Info. | | | | |

• Assessment method

| | Const. stage | | Operat. stage | Demolition. Stage |
|---|---|---|---|---|
| Const. stage | Prod. process | Direct input method | Living space | Demolition. process |
| Prod. stage | | | | |
| Work. stage | ☐ Standard Bldg. | | | |
| | ☐ Assessment Bldg. | | | |

• Energy, CO₂ emissions

Unit: MJ/m²    Unit: CO₂/m²

3000000
1500000        200000
               100000

Prod. Maint. Demolition.    Prod. Maint. Demolition.
*Energy emissions*          *CO₂ emissions*

Assessment result
Standard Bldg. contrast 4214.88%
CO₂ Reduction(%) 173650.08Kg- CO₂/m²

Assessment Info.
Assessment program : LOCAS Ver 1.0
Assessment Date: 2011- 04- 21
Evaluator: LOTTE ENG.&CONST.

Operat. stage
Maint. stage
Demolition. stage

Assessment result
LCE assessment
LCCO² assessment
Overall assessment

| Stage | Energy Consumption(MJ/m²) | | | CO₂ Emissions (Kg- CO₂/m²) | | |
|---|---|---|---|---|---|---|
| | Standard | Assmt. | Reduction(%) | Standard | Assmt. | Reduction(%) |
| Const. stage | | | | | | |

Back                                                                     Save

Fig. 5B

| Simple Assessment | Detailed Assessment | Site Assessment | Assessment Analysis | Assessment LIST | Notice List | Admin mode |

Detailed Assessment

Basic Info.

Design Info.
Basic Info.
Optional Info.

- Building Outline

| | Project Name | | Plottage | |
| | Site Location | | Bldg. area | |

[Search]

Const. stage
Prod. stage
Work. stage

- Area in each Residential Household

| | TYPE | Household Number | Supply Area | Public Area | Contract Area |
|---|---|---|---|---|---|
| ☐ | 28 | 196 | 93.1 | 31.21 | 124.31 |
| | Total | 1767 | 213448.35 | 71979.13 | 285427.48 |

[Add] [Delete]

Operat. stage

- Area in each Attached facilities

Maint. stage

| TYPE | Attached facilities | Living Space | Parking Lot |
|---|---|---|---|
| 1st Basement | 74.47 | 640.25 | 27.71 |
| Total | 3996.4 | 1863.38 | 947397 |

Demolition. stage

Assessment result
LCE assessment
LCCO² assessment
Overall assessment

[Gross floor area Calculation]

[Back] [Next]        [Save]

Fig. 5C

| Simple Assessment | Detailed Assessment | Site Assessment | Assessment Analysis | Assessment LIST | Notice List | Admin mode |
|---|---|---|---|---|---|---|

Detailed Assessment

Optional Info. Input

| Basic Info. Optional Info. | • New Generation Energy | | Standard | | | | Assessment | | | |
|---|---|---|---|---|---|---|---|---|---|---|
| | | Solar Energy | Usage(KWP) | Uptime(H) | Life(Y) | | Usage(KWP) | Uptime(H) | Life(Y) | |
| | | | 20 | 2.3 | 60 | | 20 | 2.3 | 60 | |
| | • Housing Unit | NO. | Use | Bldg. Name | Ground Floor Number | | | | Structure Form | |
| | | 1 | Apt. house | 101 | 15 | | | | Box Frame | |
| | • Attached Unit | NO. | Use | Name | | | Name | | Floor Number | |
| | | | Community Institution | Shopping Center | | | | | 2 | |
| | | Select & Delete | Building Add | | | | | | | |
| | • Underground Parking Lot | NO. | Use | Name | | | Name | | Floor Number | |
| | | | Parking Lot | Underground Parking Lot | | | | | 1 | |
| | | Select & Delete | Building Add | | | | | | | |

Const. stage
Prod. stage
Work. stage

Operat. stage

Maint. stage

Demolition. stage

Assessment result
LCE assessment
LCCO² assessment
Overall assessment

Back | Next

Save

Fig. 5D

| Simple Assessment | Detailed Assessment | Site Assessment | Assessment Analysis | Assessment LIST | Notice List | Admin mode |
|---|---|---|---|---|---|---|

Detailed Assessment

*Prod. stage*

- Design Info.
  - Basic Info.
  - Optional Info.
- Const. stage
  - *Prod. stage*
    - Work. stage
- Operat. stage
- Maint. stage
- Demolition. stage
- Assessment result
  - LCE assessment
  - LCCO² assessment
  - Overall assessment Const. progress | Temporary const. ▼ | Const. Progress Add

| | | Public works const. | | Equipment const. | | Landscaping | |
|---|---|---|---|---|---|---|---|
| Bldg. const. | Name of goods | Quantity | | Energy Consumption(MJ) | | CO₂ emissions (Kg- Co₂) | |
| | | Standard | Assmt. | Standard | Assmt. | Standard | Assmt. |
| ☐ | Sight Rail | 42959.66 | 108607 | 3.59 | 9.07 | 0.24 | 0.62 |
| ☐ | Supporting Post | 3066.11 | 4481 | 4.85 | 7.09 | 0.15 | 0.21 |
| | | | Total | | 141.83 | | 4.61 |

Select & Delete | Material Add | Amount Copy

Back | Next

Save

- *Addition Material*

| Code | Name | E. CO₂ Basic Unit | Material Group | Concrete ▼ |
|---|---|---|---|---|
| | | Partial name | | |
| | | Home pottery ▼ | | |

Cancel | Confirm

- *Bldg. const.*

| ☐ | No | Const. process |
|---|---|---|
| ☐ | 1 | Temporary const. |
| ☐ | 2 | Foundation const. |

Select & Delete | Process Add

Cancel | Confirm

Fig. 5E

| Simple Assessment | Detailed Assessment | Site Assessment | Assessment Analysis | Assessment LIST | Notice List | Admin mode |
|---|---|---|---|---|---|---|

Detailed Assessment

*Work. stage*

| Design Info. | • Transport Stage | | | | | |
|---|---|---|---|---|---|---|
| Basic Info. | Energy Source | Unit | Energy consumption (MJ/m²) | | CO₂ emissions (Kg- Co₂/m²) | |
| Optional Info. | | | Standard | Assessment | Standard | Assessment |
| | ☐ Diesel | ℓ | 108.13 | 108.13 | 7.4 | 7.4 |
| | Total | | 108.13 | | | 7.4 |
| Const. stage | Select & Delete    Energy Source Add | | | Amount Copy | | |
| Prod. stage | | | | | | |
| Work. stage | • Work. stage | | | | | |
| | Energy Source | Unit | Energy consumption (MJ/m²) | | CO₂ emissions (Kg- Co₂/m²) | |
| Operat. stage | | | Standard | Assessment | Standard | Assessment |
| | ☐ Diesel | ℓ | 90.66 | 90.66 | 6.2 | 6.2 |
| Maint. stage | ☐ Gasoline | ℓ | 1.61 | 1.61 | 0.1 | 0.1 |
| | Total | | 186.5 | 186.5 | 10.96 | 10.96 |
| Demolition. stage | Select & Delete    Energy Source Add | | | | | |
| Assessment result | Back    Next | | | | Save | |
| LCE assessment | | | | | | |
| LCCO² assessment | | | | | | |
| Overall assessment | | | | | | |

Fig. 5E

| | | | | | | | |
|---|---|---|---|---|---|---|---|
| Simple Assessment | Detailed Assessment | Site Assessment | Assessment Analysis | | Assessment LIST | Assessment Notice List | Admin mode |

Detailed Assessment

Operat. stage

Design Info.
 Basic Info.
 Optional Info.

* Heating method Select

Standard | Central heating(General) ▼ |   Assessment | Each heating method (City gas) ▼ |

○ Estimation model method  ○ Direct input method building  ○ Energy efficiency rating method Const. stage
 Prod. stage
 Work. stage

| Energy Source | Unit | Energy consumption (MJ/m²) | | $CO_2$ emissions (Kg-$Co_2$/m²) | |
|---|---|---|---|---|---|
| | | Standard | Assessment | Standard | Assessment |
| Propane | Kg | 547.34 | 39.31 | 31.36 | 2.25 |
| Electricity | Kwh | 18067.32 | 19054.98 | 893.33 | 942.16 |
| Total | | 44666.28 | 43161.19 | 2300.69 | 2159.2 |

Operat. stage

Select & Delete | Energy Source Add | Amount Copy

Back | Next | | | | Save

Maint. stage

Demolition. stage

Assessment result
 LCE assessment
 LCCO² assessment
 Overall assessment

Fig. 5G

| Simple Assessment | *Detailed Assessment* | Site Assessment | Assessment Analysis | Assessment LIST | Notice List | Admin mode |

*Detailed assessment*

*Maint. stage*

| Bldg. const. | Public works const. | Equipment const. | | | | | |
|---|---|---|---|---|---|---|---|
| | | | Energy consumption (MJ/m²) | | CO₂ emissions (Kg-Co₂/m²) | | |
| Code | Goods Name | | Standard | Assessment | Standard | Assessment | |
| ☐ | Sight Rail | | 0 | 0 | 0 | 0 | |
| ☐ | Supporting post | | 0 | 0 | 0 | 0 | |
| ☐ | PVC Pipe | | 2.58 | 2.58 | 0.19 | 0.19 | |
| | Total | | 3582.58 | 3074.63 | 172.04 | 173.48 | |

Select & Delete

Back  Next                                              Save

- Design Info.
  - Basic Info.
  - Optional Info.
- Const. stage
  - Prod. stage
  - Work. stage
- Operat. stage
- *Maint. stage*
- Demolition. stage
- Assessment result
  - LCE assessment
  - LCCO² assessment
  - Overall assessment

Fig. 5H

| Simple Assessment | Detailed Assessment | Site Assessment | Assessment Analysis | | | Assessment LIST | | Notice List | Admin mode |
|---|---|---|---|---|---|---|---|---|---|

Detailed Assessment

Demolition. stage

■ *Amount of Wastes Calculation*

| | | Standard | | | Assessment | | |
|---|---|---|---|---|---|---|---|
| Design Info. | | Concrete | The others | Total | Concrete | The others | Total |
| Basic Info. Optional Info. | Amount (TON) | 4557773.68 | 49186.74 | 522718.21 | 4557773.68 | 49186.74 | 522718.21 |

■ *Building Disposal Process*

| | Standard | | Assessment | |
|---|---|---|---|---|
| Const. stage Prod. stage Work. stage | Disposal Equipment | Backhoe(1.0m3)+ ▼ | 3.64 l/ton | Backhoe(1.0m3)+ ▼ | 2.38 l/ton |

■ *Waste transport Process*

| | Standard | | Assessment | |
|---|---|---|---|---|
| Operat. stage | Vehicles Select | 20ton dump truck ▼ | 2.85 l/ton | 20ton dump truck ▼ | 2.33 l/ton |

■ *Waste burial Process*

| | Standard | | Assessment | |
|---|---|---|---|---|
| Maint. stage | Waste burial | Dozer(D8N15PL.6PL)+ ▼ | 0.15 l/ton | Dozer(D8N15PL.6PL)+ ▼ | 0.15 l/ton |

Demolition. stage

■ *Assessment result*

| | | | Energy consumption (MJ/m²) | | $CO_2$ emissions (Kg-$Co_2$/m²) | |
|---|---|---|---|---|---|---|
| Assessment result LCE assessment LCCO² assessment Overall assessment | | E. Source | Unit | Standard | Assessment | Standard | Assessment |
| | Bldg. Dispo. | Diesel | ℓ | 247.91 | 162.34 | 16.96 | 11.11 |
| | | Total | | 303.98 | 214.6 | 20.8 | 14.68 |

| Select & Delete | | Back | Next | | | Save |
|---|---|---|---|---|---|---|

| Simple Assessment | Detailed Assessment | Site Assessment | Assessment Analysis | Assessment List | Notice List | Admin mode |

Site Assessment

Basic Info.

■ Building Outline

| | Project Name | | Plottage | |
|---|---|---|---|---|
| | Search | Site Location | | Bldg. area | |

- Basic Info.
- Assessment History Management
- Prod. stage
- Work. stage
- Assessment result
- Work. assessment
- Overall assessment ■ Construction Duration Setting

| Starting time | | Completion time | | Construction duration | |
|---|---|---|---|---|---|
| 2000 ▶ | January ▶ | 2011 ▶ | January ▶ | 1 ▶ | Months |

■ Transport Stage Plan Value Setting

| | Code | Material | Standard | Transport Vehicles | Energy Consumption(MJ) | CO₂ Emissions (Kg- Co₂) |
|---|---|---|---|---|---|---|
| ☐ | | Rebar | | 20TON Dump | 0 | 0 |

Select & Delete    Item add

■ Work. stage Plan Value Setting

| Energy Source | Unit | Energy consumption (MJ/m²) | Energy consumption (MJ/m²) | CO₂ emissions (Kg- Co₂/m²) |
|---|---|---|---|---|
| Diesel | ℓ | | 90.66 | 6.2 |
| | Total | | | |

Select & Delete    Energy Source Add

■ New Generation Energy Production Plan Value Setting

| Solar Energy | (KWP) | Energy consumption (MJ/m²) | CO₂ emissions (Kg- Co₂/m²) |
|---|---|---|---|
| | 1 | 1 | 1 |

Back    Next    Save

Fig. 6D

| Simple Assessment | Detailed Assessment | Site Assessment | Assessment Analysis | Assessment LIST | Notice List | Admin mode |
|---|---|---|---|---|---|---|

Site Assessment

*Prod. stage*

| | | | Const. Progress | Temporary const. | ▼ | | Const. Progress | Add |
|---|---|---|---|---|---|---|---|---|

Basic Info.

Assessment History Management

*Prod. stage*

Work. stage

Assessment result
Work. assessment
Overall assessment

| Bldg. const. | Public works const. | | Equipment const. | | Landscaping | |
|---|---|---|---|---|---|---|
| | | | Energy consumption (MJ/m²) | | CO₂ emissions (Kg-Co₂/m²) | |
| Code | Goods Name | | Plan | Execution | Plan | Execution |
| ☐ | Sight Rail | | 3.59 | 9.07 | 0.24 | 0.62 |
| ☐ | Supporting post | | 4.85 | 7.09 | 0.15 | 0.21 |
| | Total | | 234.6 | 141.86 | 7.18 | 4.61 |

[Select & Delete] [Material Add] [Amount Copy]

[Back] [Next]

[Save]

Fig. 6E

| Simple Assessment | Detailed Assessment | Site Assessment | Assessment Analysis | Assessment LIST | Notice List | Admin mode |

Site Assessment

| | Work. stage | | | | | |
|---|---|---|---|---|---|---|
| Basic Info. | ■ *Transport of materials* | | | | | |

| | Code | Material | Transport Vehicles | Amount of transport | | Energy Consumption (MJ/m²) | CO₂ Emissions (Kg- Co₂) |
|---|---|---|---|---|---|---|---|
| | | | | Plan | Execution | | |
| Assessment History Management | ☐ | Rebar | 20TON | 24409 | 24409 | 37.9 | 2.59 |
| | Select & Delete | Item Add | | | | | |

■ *Used Equipment*

| Prod. stage | | Eqpt. Name | E. Source | Unit | Number of use | | Energy Consumption (MJ/m²) | CO₂ Emissions (Kg- Co₂/m²) |
|---|---|---|---|---|---|---|---|---|
| | | | | | Plan | Execution | | |
| Work. stage | ☐ | | Diesel | ℓ | 310 | 310 | 37.9 | 2.593 |
| | Select & Delete | Equipment Add | | | | | | |

Assessment result
Work. assessment
Overall assessment

■ *Field office*

| E. Source | Unit | Amount of use | | Energy Consumption (MJ/m²) | CO₂ emissions (Kg- Co₂/m²) |
|---|---|---|---|---|---|
| | | Plan | Execution | | |
| Electricity ▼ | Kwh | 2006197 | 2006197 | 62.04 | 3.07 |
| Select & Delete | E. Source Add | | | | |

■ *New Generation Energy*

| Solar Energy | Amount of Install(KWP) | Plan Electricity Output (Kwh) | Execution Electricity Output (Kwh) | Energy Consumption (MJ/m²) | CO₂ emissions (Kg- Co₂/m²) |
|---|---|---|---|---|---|
| | 1 | 1 | 1 | 0 | 0 |

Back | Next | | | | Save

Fig. 6F

| | | Simple Assessment | Detailed Assessment | Site Assessment | Assessment Analysis | Assessment LIST | Notice List | Admin mode |
|---|---|---|---|---|---|---|---|---|

Site Assessment

Assessment result

- Assessment History

| Basic Info. | Project Name | Assessment date | Evaluator | Progress Rate(%) | Energy·CO₂ Assessment value | |
|---|---|---|---|---|---|---|
| Assessment history Management | | 2011-01-17 | Evaluator | 100 | Energy (MJ/m²) | CO₂ (Kg-Co₂/m²) |
| | | | | | 24632.46 | 953.94 |

- Accumulation Present Condition

Prod. stage — Unit MJ/m² — □ Plan / ▭ Execution

Work. stage — Unit CO₂/m² — □ Prod. Stage / ▭ Const. Stage

Prod. Trans. Work.  Plan  Execution
Energy emissions   Total CO₂ emissions

Assessment result
Work. assessment
Overall assessment

| Stage | Energy Consumption(MJ/m²) | | | CO₂ Emissions (Kg- Co₂/m²) | | |
|---|---|---|---|---|---|---|
| | Plan | Execution | Cumulant(%) | Plan | Execution | Cumulant(%) |
| Material Prod. | 24651.3 | 24651.3 | 100.54 | 937.55 | 952.36 | 101.58 |
| Material Transport | 58.28 | 19.87 | 34.1 | 3.99 | 1.36 | 34.1 |
| Const. | 186.5 | 186.74 | 100.13 | 10.96 | 11.6 | 105.79 |
| New Generation E. | -6 | -225.45 | 0 | -6 | -11.38 | 0 |
| Total | 24756.92 | 24632.46 | 99.5 | 946.5 | 953.94 | 100.79 |

Back

Fig. 6G

| | Simple Assessment | Detailed Assessment | Site Assessment | Assessment Analysis | Assessment LIST | Notice List | Admin mode |
|---|---|---|---|---|---|---|---|

Site Assessment

*Overall assessment*

■ *Building Outline*

| | | Project Name | | Plottage | |
|---|---|---|---|---|---|
| Basic Info. | | Site Location | | Bldg. area | |

Assessment history Management

■ *Assessment Method*

| | Const. stage | | Operat. stage | Demolit. stage |
|---|---|---|---|---|
| Prod. stage | Prod. process | Direct input method | Living space | Demolit. process |

■ *Energy, CO₂ Emissions*  ☐ Standard Bldg.  ☐ Assessment Bldg.

Unit: MJ/m²       Unit: CO₂/m²

50000                 3000

25000                 1500

Prod. Maint. Demolition.    Prod. Maint. Demolition.

*Energy emissions*        *CO₂ emissions*

Assessment result
Standard Bldg. contrast 5.84%
CO₂ Reduction(%) 146.17Kg- CO₂/m²

Assessment Info.
Assessment program : LOCAS Ver 1.0
Assessment Date: 2011- 04- 22
Evaluator: *LOTTE ENG.&CONST.*

Work. stage

Assessment result
Work. assessment
*Overall assessment*

| Stage | Energy Consumption(MJ/m²) | | | CO₂ Emissions (Kg- CO₂/m²) | | |
|---|---|---|---|---|---|---|
| | Standard | Assmt. | Reduction(%) | Standard | Assmt. | Reduction(%) |
| Const. stage | | | | | | |

Back

Fig. 8B

| Simple Assessment | Detailed Assessment | Site Assessment | Assessment Analysis | | Assessment LIST | Notice List | Admin mode |

Assessment Analysis

■ *Assessment history Inquiry*

| Assessment Year | 2011 ▼ | Use | Apartment house ▼ | Evaluator | | Search |

Project Name: [        ]

Search result

| NO. | Project Name | Use | Simple Assessment | Detailed Assessment | Completion Assessment | Evaluator | Assessment Date |
|---|---|---|---|---|---|---|---|
| 8 | | | | | | lotte_test | 2011-1-17 |
| 7 | | | | | | lotte_test | 2011-1-17 |
| 6 | | | | | | lotte_test | 2011-1-17 |
| 5 | | | ☐ | | | lotte_test | 2011-1-17 |
| 4 | | | | | | lotte_test | 2011-1-17 |
| 3 | | | ☐ | ☐ | | lotte_test | 2011-1-17 |
| 2 | | | ☐ | ☐ | | lotte_test | 2011-1-16 |
| 1 | | | | | ☐ | | |

◀ 1 2 3 4 5 6 ▶

[Save]

Sidebar:
- Assessment Analysis
- Assessment History Inquiry
- Assessment result comparison analysis
  - Energy consumption Comparison
  - $CO_2$ emissions Comparison
- Data analysis/ Assessment
  - Const. stage Data
  - CO2 Major emission materials
  - Work. Stage Data
  - Operat. Stage Data

[Energy Consumption Comparison]  [CO₂ Emissions Comparison]

Fig. 8C

| Simple Assessment | Detailed Assessment | Site Assessment | Assessment Analysis | | | Assessment LIST | Assessment List | Notice List | Admin mode |
|---|---|---|---|---|---|---|---|---|---|

Assessment Analysis

▪ *Energy consumption Comparison*

■ *Energy Consumption Comparison Table*

Unit, MJ/m²(%)

| Assessment History Inquiry | Standard Setting | ◎ | ○ | ○ | ○ | ○ | ○ |
|---|---|---|---|---|---|---|---|
| | Another name | A | B | C | | | Average |
| | Project Name | | | | | | |

| Assessment result comparison Analysis | Assessment Method | | Simple Assessment | Detailed Assessment | Completion Assessment | | | |
|---|---|---|---|---|---|---|---|---|
| *Energy consumption Comparison* | Const. Stage | Prod. Stage | 1301.83 | 24518.13 | 0 | 0 | 0 | 8606.666 |
| CO₂ emissions Comparison | | Trans. Stage | 108.13 | 108.13 | 0 | 0 | 0 | 72.08666 |
| | | Work. Stage | 186.5 | 186.5 | 0 | 0 | 0 | 124.3333 |
| | Total | | 1596.46 | 24812.76 | 0 | 0 | 0 | 8803.073 |

■ *Energy Consumption Comparison Graph*

Data analysis/ Assessment

Const. stage Data
CO2 Major emission materials
Work. Stage Data
Opreat. Stage Data

Fig. 8D

| Simple Assessment | Detailed Assessment | Site Assessment | Assessment Analysis | Assessment LIST | Assessment List | Notice | Admin mode |
|---|---|---|---|---|---|---|---|

Assessment Analysis

■ $CO_2$ Emissions Comparison

■ $CO_2$ Emissions Comparison Table

Unit, MJ/m²(%)

| | | | | | | |
|---|---|---|---|---|---|---|
| Standard value set | | ◎ | ○ | ○ | ○ | Average |
| Another name | | A | B | C | | |
| Project Name | | | | | | |
| Assessment Method | | Simple Assessment | Detailed Assessment | Completion Assessment | | |
| Const. stage | Prod. Stage | 66.59 | 936.76 | 0 | | |
| | Trans. Stage | 7.4 | 7.4 | 0 | | |
| | Work. Stage | 10.96 | 10.96 | 0 | | |
| | Total | 84.95 | 955.12 | 0 | | |

■ $CO_2$ Emissions Comparison Graph

Unit, MJ/m²    1300000

☐ Const. stage
⋮ ⋮ Oper./Mag. stage
☐ Demolit. stage

A  B  C

_Unit area Energy Emissions_

1300000    Unit, MJ/m²

☐ A
⋮ ⋮ B
☐ C

Const. Opreat. Demolit.

_Unit area Energy Emissions_

Assessment Analysis
Assessment History Inquiry

Assessment result comparison analysis
Energy consumption Comparison
$CO_2$ emissions Comparison

Data analysis/ Assessment
Const. stage Data
CO2 Major emission materials
Work. Stage Data
Operat. Stage Data

Fig. 8E

| Simple Assessment | Detailed Assessment | Site Assessment | Assessment Analysis | Assessment LIST | Notice List | Admin mode |

Assessment Analysis

Const. stage data analysis

■ *Each const. energy consumption and CO₂ emissions data analysis table*

| | | | | | Energy consumption (MJ/m²) | | | CO2 Emissions (Kg- Co2/ m²) | | |
|---|---|---|---|---|---|---|---|---|---|---|
| NO. | Project Name | Use | Struct. Form | G. F. Area | Material Prod. | Const. stage | Life Cycle | Material Prod. | Const. stage | Life Cycle |
| 7 | Lotte | | | | | | | | | |
| 6 | C- 4,5,6 | Apt. | RC | | | 23052. | 67181. | | 814.22 | 3037.1 |
| 5 | H- Test | | | | | | | | | |
| 4 | L- Castle | | | | | | | | | |
| 3 | L- Hotel | | | | | | | | 1238.6 | |
| 2 | S- A3 | Apt. | RC | | | | | | | |
| 1 | C- 4,5,6 | Apt. | RC | | | 24812. | 71383. | | 955.12 | 3310.6 |

[ Next ]

- Assessment History inquiry
- Assessment result comparison analysis
  - Energy consumption Comparison
  - CO₂ emissions Comparison

Data analysis/ Assessment

Const. stage Data
- CO2 Major emission materials
- Work. Stage Data
- Operat. Stage Data

Fig. 8F

| Simple Assessment | Detailed Assessment | Site Assessment | Assessment Analysis | | Assessment LIST | Notice List | Admin mode |
|---|---|---|---|---|---|---|---|

Assessment Analysis

CO₂ major emission materials analysis

• Amount of $CO_2$ major emission materials used analysis

| NO. | Project Name | Use | Struct. Form | G. F. Area | Concrete (m/m²) | Rebar (kg/m²) | Steel (kg/m²) | Mold (m²/m²) |
|---|---|---|---|---|---|---|---|---|
| 7 | Lotte | | | | | | | |
| 6 | C-4,5,6 | Apt. | RC | | 0.3531 | 0.0839 | | 2.9045 |
| 5 | H-Test | | | | | | | |
| 4 | L-Castle | | | | | | | |
| 3 | L-Hotel | | | | | | | |
| 2 | S-A3 | Apt. | RC | | 1.1468 | 0.86 | | 3.6343 |
| 1 | C-4,5,6 | Apt. | RC | | 0.3529 | 0.0839 | | 2.9028 |

◀ 1 ▶

[ Back ]  [ Next ]

Assessment history inquiry
Assessment result comparison analysis
Energy consumption Comparison
CO₂ emissions Comparison

Data analysis/ Assessment
Const. stage Data
*CO2 Major emission materials*
Work. Stage Data
Operat. Stage Data

Fig. 8G

| Simple Assessment | Detailed Assessment | Site Assessment | Assessment Analysis | | Assessment LIST | Notice List | Admin mode |

Assessment Analysis

- *Work Stage data analysis*

| | | | | | | Energy consumption (MJ/m²) | | |
| | | | | | | CO₂ emissions (Kg-Co₂/m²) | | |
| NO. | Project Name | Use | Struct. Form | G. F. Area | Material Trans. | Used Equipment | Field Office | New Generation E. |
|---|---|---|---|---|---|---|---|---|
| 7 | Lotte | | | | | | | |
| 6 | C- 4,5,6 | Apt. | RC | | | | | |
| 5 | H- Test | | | | | | | |
| 4 | L- Castle | | | | | | | |
| 3 | L- Hotel | | | | | | | |
| 2 | S- A3 | Apt. | RC | | | | | |
| 1 | C- 4,5,6 | Apt. | RC | | | | | |

◄ 1 ►

[Back]  [Next]

Assessment Analysis
Assessment history inquiry
Assessment result comparison analysis
Energy consumption Comparison
CO₂ emissions Comparison

Data analysis/ Assessment
Const. stage Data
CO2 Major emission materials
Work. Stage Data
Operat. Stage Data

Fig. 8H

| Simple Assessment | Detailed Assessment | Site Assessment | Assessment Analysis | | | | Assessment LIST | Assessment List | Notice List | Admin mode |

Assessment Analysis

*Operat. Stage data analysis*

- *Amount of Building Annual energy used (Detailed Assessment direct entry method)*

| | NO. | Project Name | Use | Struct. Form | G. F. area | Heating method | Energy consumption(MJ/m²) | | | | |
|---|---|---|---|---|---|---|---|---|---|---|---|
| | | | | | | | Oil | Gasoline | Kerosene | Propane |
| Assessment History Inquiry | 7 | Lotte | | | | | | | | |
| Assessment result comparison analysis | 6 | C- 4,5,6 | Apt. | RC | | Individual (Gas) | 0 | 0 | 0 | 0 |
| Energy consumption Comparison | 5 | H- Test | | | | | | | | |
| CO₂ emissions Comparison | 4 | L- Castle | | | | | | | | |
| | 3 | L- Hotel | | | | | | | | |
| Data analysis/ Assessment | 2 | S- A3 | Apt. | RC | | Individual (Kerosene) | 0 | 0 | 0 | 0 |
| Const. stage Data CO2 Major emission materials Work. Stage Data Operat. Stage Data | 1 | C- 4,5,6 | Apt. | RC | | Individual (Gas) | 0 | 0 | 0 | 0 |

▼ 1 ▲

Back

Fig. 9A

| Simple Assessment | Detailed Assessment | Site Assessment | Assessment Analysis | Assessment LIST | Notice List | *Admin mode* |
|---|---|---|---|---|---|---|

*Admin mode*

*User Mgmt.*
ADMIN Mgmt.
*User present condition*

*Project Mgmt.*
Project History Inquiry

Data Base mgmt.
Simple/detailed Assmt. DB
Site Assmt. DB
General List

*User present condition*

| | Lotte Construction | | Hanyang university | | | | |
|---|---|---|---|---|---|---|---|
| No | ID | NAME | Department | Duty | Level | | |
| 31 | sksarchi | Kang soo-kang | | | PM | Detail | |
| 30 | kchack | Chang hak-kim | Design Laboratory | Assistant Manager | PM | Detail | |
| 29 | k21cmy | Ki tae-kim | Estimation team | Assistant Manager | PM | Detail | |
| 28 | Carnofus65 | Do kyun-jo | Design Laboratory | Chief Officer | PM | Detail | |
| 27 | inching | Chi bok-in | Enterprising headquarter | M2 | PM | Detail | |
| 26 | yoonaram | A ram-yun | 20707025 | Assistant Manager | PM | Detail | |
| 25 | chocohj | hyo jung-hong | Design Laboratory | Assistant Manager | Guest | Detail | |

| Simple Assessment | Detailed Assessment | Site Assessment | Assessment Analysis | Assessment LIST | Notice List | Admin mode |
|---|---|---|---|---|---|---|

Admin mode

*Project history inquiry*

User Mgmt.
ADMIN Mgmt.
User present condition

| Affiliation | | Assessment division | Simple Assmt. ▶ | Assmt. completion duration | _(D)/_(M)/_(Y) ~ - (D)/_(M)/_(Y) |
|---|---|---|---|---|---|
| Use | Apt. ▶ | Evaluator | | Project name | |

Project Mgmt.
*Project History Inquiry*

[Search]

■ *Project History Inquiry Result*

Data Base mgmt.
Simple/detailed Assmt. DB
Site Assmt. DB

General List

| | NO. | Affiliation | Project Name | Use | Evaluator | Simple Assessment | Detailed Assessment | Site Assmt. | Completion Assmt. |
|---|---|---|---|---|---|---|---|---|---|
| ☐ | 67 | Lotte | dev | Apt. | lotte-test | Assessment complete Start Date: 21 Apr Last Date: 21 Apr | Assessing S. Date: 21 Apr L. Date: 22 Apr | | |
| ☐ | 66 | Lotte | aa | Apt. | lotte-test | Assessment complete Start Date: 19 Apr Last Date: 20 Apr | Assessing S. Date: L. Date: | | |

◀ 1 2 3 4 5 6 7 ▶

[Select & Delete]

Fig. 9C

| Simple Assessment | Detailed Assessment | Site Assessment | Assessment Analysis | Assessment LIST | Notice List | Admin mode |

Admin mode

Environmental Load Ratio in Simple Assessment stage

| | Apply facilities | Stricture Form | Structure Method and Form | Concrete Input(m³/m²) |
|---|---|---|---|---|
| User Mgmt.<br>ADMIN Mgmt.<br>User present condition | Apartment House | Major materials Environmental load Ratio | 10 % | 20 |
| | | Bldg. const. | 30 % | 40 |
| Project Mgmt.<br>Project History Inquiry | | Public works const. | 50 % | 60 % |
| | | Equipment const. | 70 % | 80 % |
| Data Base Mgmt. | | Total | 90 % | 100 % |
| Simple/detailed Assmt. DB | Office | Major materials Environmental load Ratio | 110 % | 120 % |
| Simple Assmt. Environ. Load | | Bldg. const. | 130 % | 140 % |
| Site Assmt. DB | | Public works const. | 150 % | 160 % |
| General List | | Equipment const. | 170 % | 180 % |
| | | Total | 190 % | 200 % |
| | Skyscraper | Major materials Environmental load Ratio | 210 % | 220 % |
| | | Bldg. const. | 230 % | 240 % |
| | | Public works const. | 250 % | 260 % |
| | | Equipment const. | 270 % | 280 % |
| | | Total | 290 % | 300 % |

Save

SYSTEM FOR ASSESSING AN ENVIRONMENTAL LOAD OF BUILDING DURING LIFE CYCLE

CROSS-REFERENCE TO RELATED APPLICATION

Priority to Korean patent application number 10-2011-0004344 filed on Jan. 17, 2011, the disclosure of which is incorporated by reference herein, is claimed.

FIELD OF THE INVENTION

The present invention relates to an environmental load assessment system of a building, including energy consumption and $CO_2$ emissions, during the life cycle and, more particularly, to an environmental load assessment system, which is capable of efficiently and simply assessing an environmental load of a building in all stages (e.g., a planning stage, a design stage, a construction stage, and a use stage after construction) in doing executing a business by subdividing an assessment process, such as simple assessment in the design stage, detailed assessment in the start stage, and site assessment in the construction stage according to the progress of a construction project.

BACKGROUND OF THE RELATED ART

International Environmental Agreement in preparation for global warming has been consistently developed up to now since the 1970's. In order to conserve the earth that has faced a worldwide environmental crisis, there was Declaration of the United Nations Conference on the Human Environment in Stockholm on June, 1972. A Sustainable Development concept that the current development must fairly satisfy the need of the current generation and future generations was declared as an official object of United Nations in Rio Summit on June, 1992. The international environment agreements are expanding towards the enforcement execution of a reduction in carbon dioxide emissions.

The construction industry belongs to a large-scale consumption field which occupies 40% or higher of natural resources consumption, 30% or higher of energy consumption, and 30% or higher of carbon dioxide emissions. The construction industry is becoming one of the major international arguing points in countermeasures for global environmental issues. Accordingly, in environmentally advanced countries, a variety of researches have been made on the assessment of carbon dioxide during the life cycle of a building in a nation level since the early part of the 1990's.

In Korea, in order to actively deal with the Climatic Change Convention and enhance sustainable development and international environment competitiveness, a variety of eco-friendly construction technologies are being developed. However, researches on the assessment of carbon dioxide emissions of a building have not yet been relatively active, as compared with the development speed of the eco-friendly construction technologies. Researches on the assessment of carbon dioxide emissions of a building have recently been attempted. One of the researches is Korean Patent Registration No. 10-0934979 entitled 'Method for Assessment Environment Impact during Life Cycle of Sustainable Building'.

Programs developed so far, including the above patent 10-0934979, are chiefly based on a method of assessing carbon dioxide emissions by simply inputting a material calculation document written after 5 months since the start of a building, but do not suggest the assessment of building planning and basic design stages of a building, carbon dioxide reduction technology/eco-friendly technology for an eco-unfriendly building, and the reflection of the suggested technologies in the design stage. Furthermore, the construction format of the programs is chiefly based on Microsoft's Excel program, and the programs are used for only simple assessment on apartment houses and are difficult to analyze and update a database (DB) based on a result of the assessment.

SUMMARY OF THE INVENTION

Accordingly, the present invention has been made to overcome the limits of a conventional system for assessing an environmental load, and it is an object of the present invention to provide an environmental load assessment system, which is capable of simply assessing an environmental load during the life cycle of a building and of updating the database of the assessment system in real time based on an assessment history and functions of accumulating and analyzing data, not only in the design stage (e.g., a building planning stage and a basic design stage) (i.e., the initial business stage of a building), but also in any stage (e.g., a planning stage, a design stage, a construction stage, or a use stage after construction) of a business execution stage.

To achieve the above object, the present invention provides a system connected to one or more user terminals and configured to assess an environmental load, including energy consumption and carbon dioxide emissions, of an building during the life cycle according to the progress of a construction project. The system includes a DB server for storing material information, environmental load information, and itemized material information about a construction work and storing environmental load information about an energy source; a management server for assessing environmental loads based on simple assessment, a detailed assessment, and site assessment according to the progress of a target assessment construction project; and a UI server for providing user terminals with an execution environment so that the management server can be operated.

BRIEF DESCRIPTION OF THE DRAWINGS

Further objects and advantages of the invention can be more fully understood from the following detailed description taken in conjunction with the accompanying drawings in which:

FIGS. 4A to 4I are diagrams showing an overview of a simple assessment module and execution screens thereof in the management server according to the construction diagram of FIG. 2;

FIGS. 5A to 5I are diagrams showing an overview of a detailed assessment module and execution screens thereof in the management server according to the construction diagram of FIG. 2;

FIGS. 6A to 6G are diagrams showing an overview of a site assessment module and execution screens thereof in the management server according to the construction diagram of FIG. 2;

FIGS. 8A to 8H are diagrams showing an overview of an assessment analysis module and execution screens thereof in the management server according to the construction diagram of FIG. 2; and FIGS. 9A to 9C are diagrams showing execution screens of a system management module in the management server according to the construction diagram of FIG. 2.

DETAILED DESCRIPTION OF EMBODIMENTS

Some exemplary embodiments of the present invention will now be described in detail with reference to the accompanying drawings.

Figure 1:
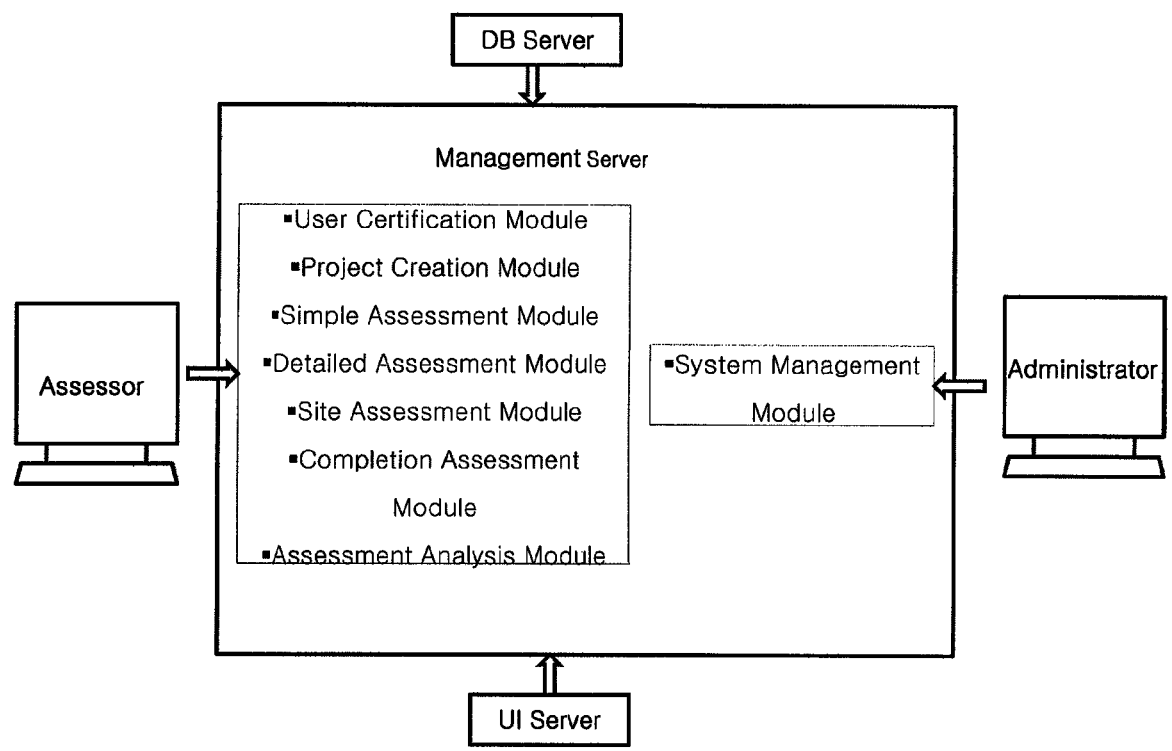
FIG. 1 is a diagram showing an overview of an environmental load assessment system according to an embodiment of the present invention.

FIG. 1 is a diagram showing an overview of an environmental load assessment system according to the present invention. The environmental load assessment system according to the embodiment of the present invention is connected to one or more user terminals and is configured to include a DB server, a management server, and a User Interface (UI) server in order to assess an environmental load, including energy consumption and $CO_2$ emissions, during the life cycle of a construction project according to the progress of the project.

The DB server is configured to store material information, environmental load information, and itemized material information about a construction work and to store environmental load information about an energy source. Furthermore, the DB server may store a variety of building laws, a variety of calculation equations, and so on. The DB server may employ data that has already been constructed in other system pertinent to construction. The DB server may be updated using data when the data is accumulated according to the active utilization of the system according to the present invention. The various data stored in the DB server may be changed by tasks, such as the modification, addition, and deletion of a system administrator.

The management server is configured to perform simple assessment based on simple material calculation, detailed assessment based on detailed material calculation, and site assessment based on site material calculation for a target assessment construction project. More particularly, the management server is configured to include a project creation module, a simple assessment module, a detailed assessment module, a site assessment module, a completion assessment module, an assessment analysis module, and a system management module. Here, the term '~module' is an element implemented using hardware or software in order to process one or more functions or operations, and a detailed function or operation of each module is described in detail later with reference to FIG. 3A.

The UI server is a UI environment (i.e., input and output environments) which provides an execution environment to the user terminals in order to perform the operation of the management server.

Users who use the assessment system according to the present invention may be classified into administrators who have server management rights to a change of the contents and forms in the DB server, the management server, and the UI server and to user management and into assessors who have assessment rights to access the management server and perform a substantial assessment work. Access of the users to the servers may be restricted according to use rights. The administrator may also serve as an assessor, and the assessor may be classified into upper and lower assessors.

Figure 2:
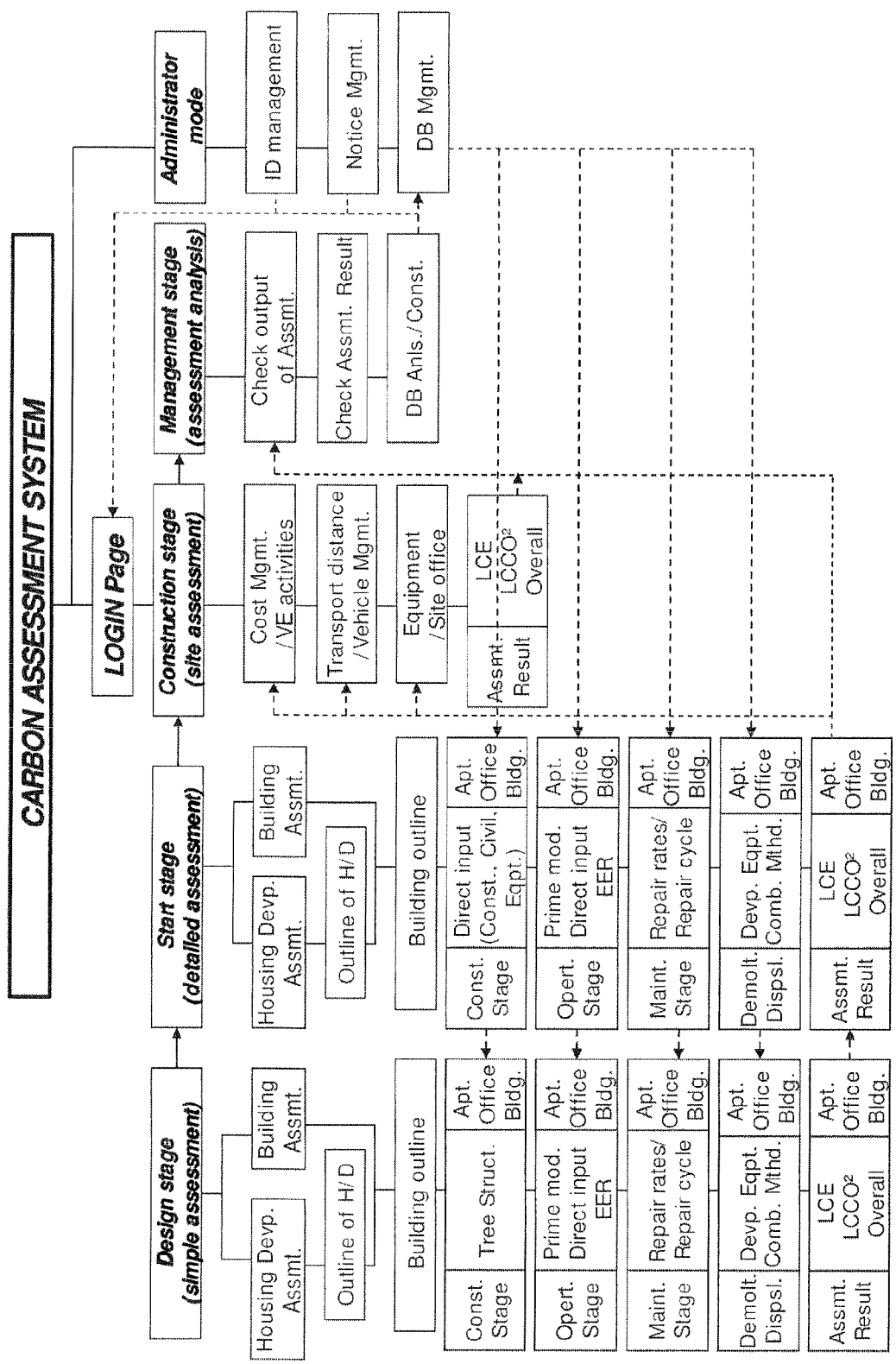
FIG. 2 shows the construction of a management server of the environmental load assessment system according to an embodiment of the present invention.
Figure 3A:
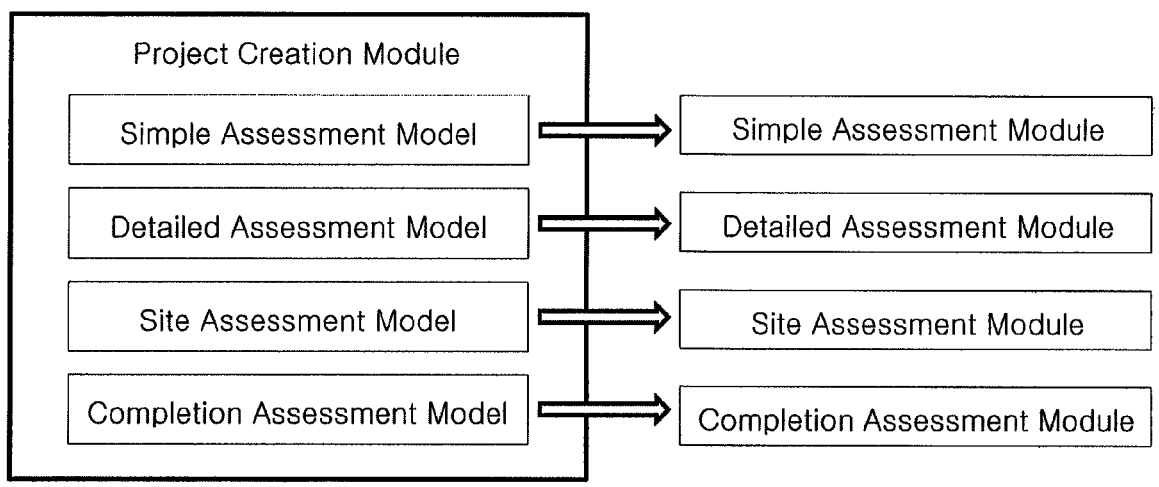
FIGS. 3A and 3B are diagrams showing an overview of a project creation module and an execution screen thereof in a management server according to the construction diagram of FIG. 2.

FIG. 2 shows the construction of the management server of the environmental load assessment system according to an embodiment of the present invention, and Figures following FIG. 3A show execution screens which are implemented by the management server according to the construction of FIG. 2. As shown, the management server is configured to include the project creation module, the simple assessment module, the detailed assessment module, the site assessment module, the completion assessment module, and the assessment analysis module. The management server is also configured to include a user certification module and a system management module for system management. Hereinafter, the construction state of the management server, and data and interface environments provided through the DB server and the UI server are described through a process of the assessor, also serving as the administrator, accessing the assessment system according to the present invention and performing an environmental load assessment work for an apartment house project.

Figure 3B:
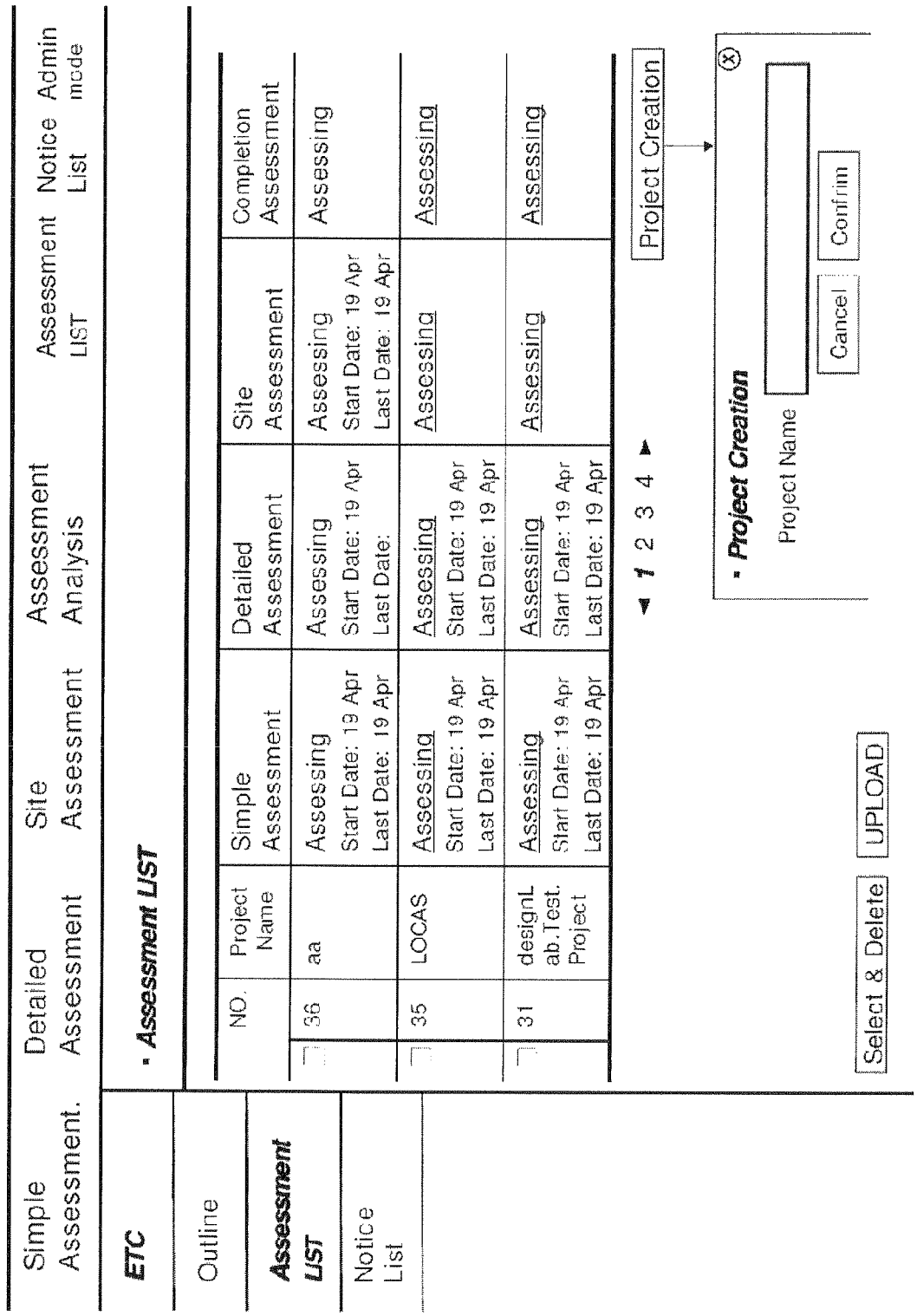

FIGS. 3A and 3B are diagrams showing an overview of the project creation module and an execution screen thereof in a management server according to the construction diagram of FIG. 2.

The project creation module is implemented to create an assessment model for each assessment method, including simple assessment based on simple material calculation, detailed assessment based on detailed material calculation, and site assessment based on site material calculation for a target assessment construction project. Furthermore, the project creation module is implemented to create a completion assessment model. In FIG. 3B, each assessment model is created by inputting a project business name to a project creation window which is created by a 'Project Creation (프로젝트 생성)' key in an 'Assessment LIST (평가 LIST)' menu, and the created assessment model is configured to perform a relevant assessment work while operating in conjunction with the assessment modules. Furthermore, in FIG. 3B, the progress of assessment for each assessment model for each construction project which is created through the 'Assessment LIST (평가 LIST)' menu, and the assessment modules for respective assessment models are accesses step by step according to a time-series relationship of data.

FIGS. 4A to 4I are diagrams showing an overview of the simple assessment module and execution screens thereof in the management server according to the construction diagram of FIG. 2. The simple assessment module may be accessed through a 'Simple Assessment (간이평가)' menu which is created through the project creation module as in FIG. 3B.

The simple assessment module is implemented to assess an environmental load of a target assessment construction project according to the simple assessment model while operating in conjunction with the DB server and the project creation module. Accordingly, the simple assessment module performs simple assessment for the environmental load on the basis of simple material calculation in relation to a planning design plan of the target assessment construction project. That is, the simple assessment module is implemented to perform simple assessment for an environmental load of a building during the life cycle by approximately estimating the amounts of major materials used according to the characteristic of the building, when the building is planned and design. The environmental load assessed by the simple assessment module may be used to determine a planning design plan to a construction project. A reduction proposal of an environmental load and environmental load reduction technology/eco-friendly technology can be applied in the building design stage through such decision-making with consideration taken of the assessment results. The simple assessment module may be configured to include substructures, such as a design information setting unit, a construction stage assessment unit, an operation/management stage assessment unit, a demolition/disposal stage assessment unit, and an assessment result analysis unit.

Figure 4A:
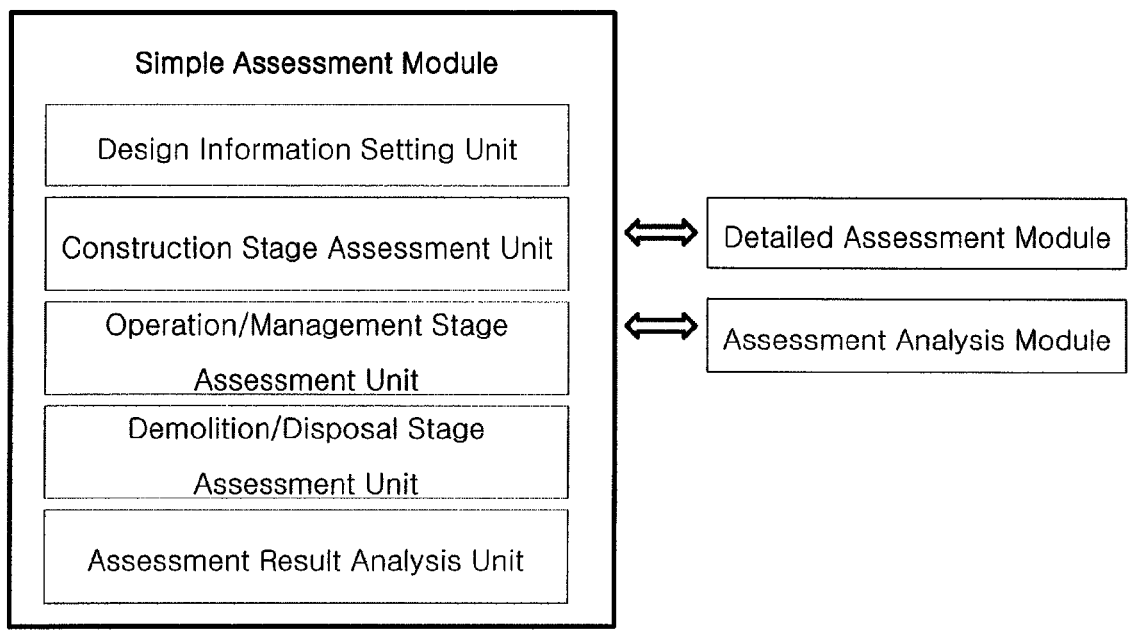
Figure 4B:
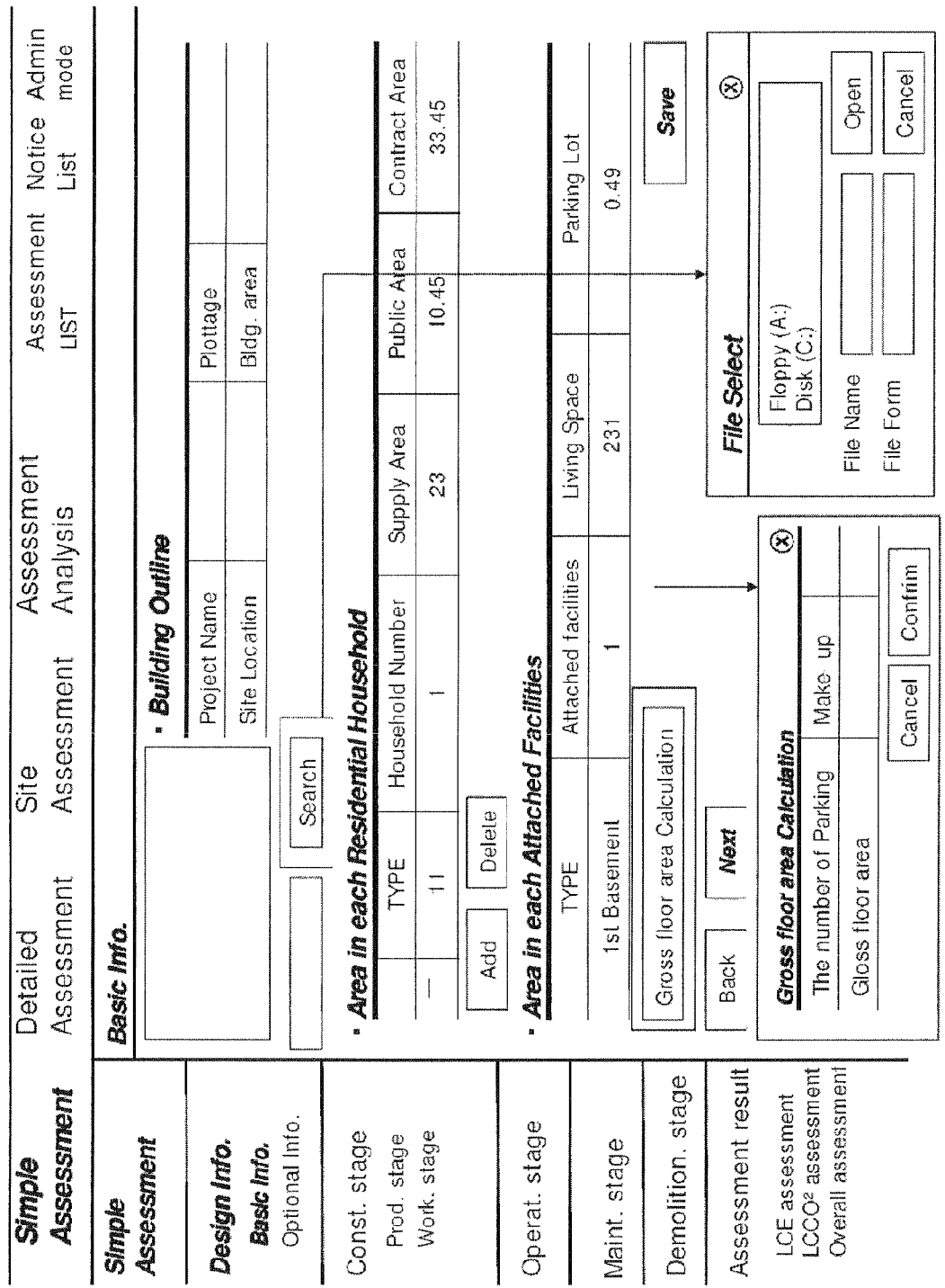

The design information setting unit of the simple assessment module is configured to receive planning design information about a target assessment construction project in the project design stage. The planning design information is information about a design plan of the target assessment construction project, and it may include pieces of basic information, such as a project name ('사업명'), a site location ('대지위치'), a regional district ('지역지구'), a use ('용도'), a structure ('구조'), plottage ('대지면적'), a building area ('건축면적'), a floor space index ('용적률'), an architectural construction ('건축구조'), and a gross floor area ('연면적'), and pieces of detailed information, such as a new generation energy production plan ('신재생에너지') and a ground floor design plan ('주거동'). The planning design information may be inputted by the assessor using a direct entry method, an upload method, or a calculation method. Alternatively, the assessor may modify and input the planning design information in the state in which default values have been automatically set. FIGS. 4B and 4C show that various pieces of basic information and detailed information about an apartment house project are inputted through a 'Essential Information Input ('필수입력정보')' menu and a 'Optional Information Input ('선택입력정보')' menu in the 'Basic Information ('기본정보')' menu by using a direct entry method, an upload method ('Search ('찾아보기')'), a calculation method ('Gross Floor Area Calculation ('연면적산출')').

Figure 4E:
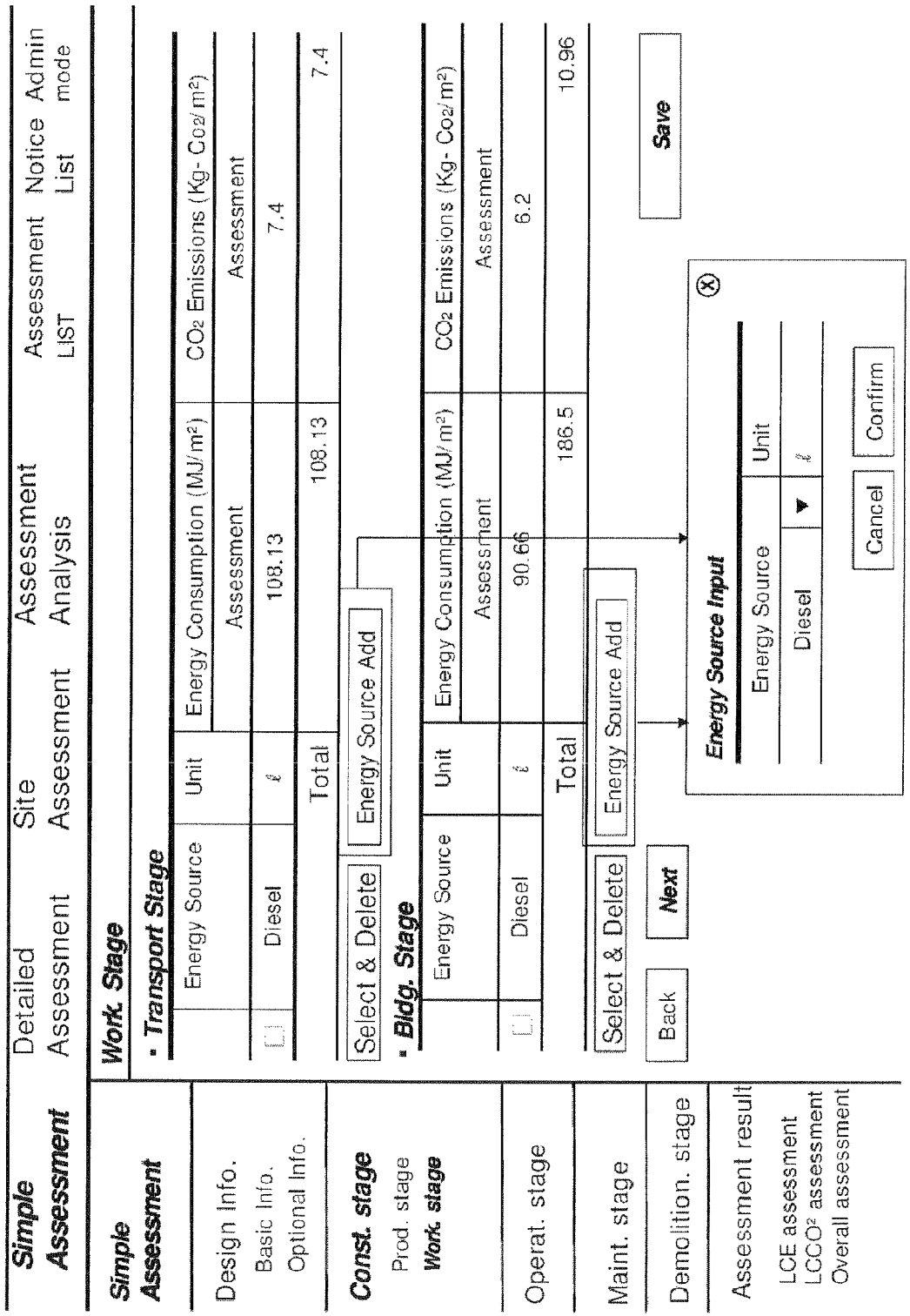
Figure 5A:
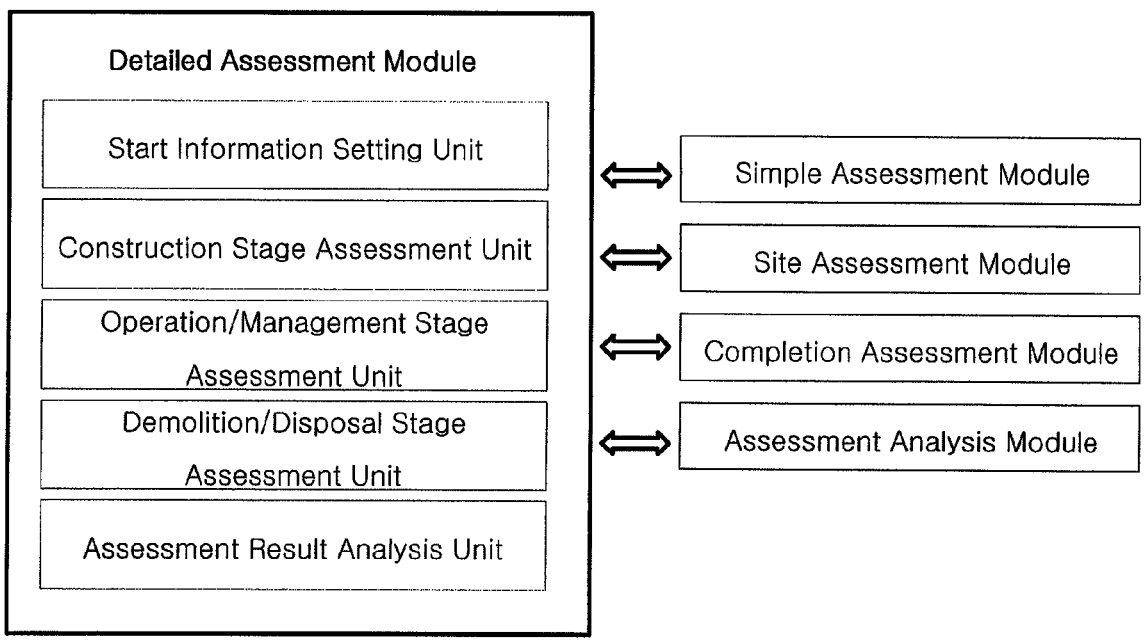

The construction stage assessment unit of the simple assessment module is configured to receive the simple amount of materials and energy consumption of a target assessment construction project which will be used in the building construction stage on the basis of the planning design information set in the design information setting unit and the various pieces of information stored in the DB server and to simply calculate an environmental load (including energy consumption and $CO_2$ emissions) in the construction stage based on the pieces of the simple amount. When the simple amount of materials is calculated and received and the energy consumption is received in the form of preliminary estimates based on material information and itemized material information stored in the DB server, the construction stage assessment unit calculates the environmental load based on the environmental load information. FIG. 4D shows the screen in which the amount of major construction materials for each construction sector is calculated and received (automatic input) through the 'Production Stage ('생산단계')' menu of a 'Construction Stage ('건설단계')' menu, energy consumed in the production stage of the construction materials and $CO_2$ emissions according to the energy consumption is calculated, and an environmental load is calculated based on the above information. FIG. 4E shows the screen in which energy consumption for the transport of materials and the operation of construction equipment and $CO_2$ emissions according to the use of an energy source are received (direct input by the assessor) through the 'Production Stage ('생산단계')' menu and the 'Working Stage ('시공단계')' menu of the 'Construction Stage ('건설단계')' menu and an environmental load is calculated.

The operation/management stage assessment unit of the simple assessment module is configured to receive and calculate energy consumption for the operation of a building and the simple amount of materials for the maintenance and management of the building which will be used in the building operation/management stage on the basis of the planning design information set in the design information setting unit and the various pieces of information stored in the DB server and to calculate an environmental load in the building operation/management stage. In the case where a design plan of a target assessment construction project is used according to its use, the operation/management stage assessment unit calculates an environmental load by estimating energy consumption and maintenance and management materials. FIGS. 4F and 4G show the screens in which energy consumption for each building operation is received according to a calculation method (e.g., a direct input method, an estimation model method, or an building energy efficiency rating method) and an environmental load is calculated based on the energy consumption and the simple amount of materials for building maintenance and management is received and an environmental load is calculated, respectively, through the 'Maintenance/Management Stage ('유지관리단계')' menu of the 'Operation Stage ('운영단계')' menu.

The demolition/disposal stage assessment unit of the simple assessment module is configured to receive the amount of wastes to be discharged and energy consumption to be used in the building demolition/disposal stage in relation to the target assessment construction project on the basis of the planning design information set in the design information setting unit and the various pieces of information stored in the DB server and to calculate an environmental load in the building demolition/disposal stage. The demolition/disposal stage assessment unit calculates the amount of wastes based on the material information and the itemized material information stored in the DB server, receives energy consumption, and calculates the environmental load based on the environmental load information. FIG. 4H shows the screen in which the amount of wastes is calculated and received through a 'Demolition/Disposal Stage ('해체/폐기단계')' menu and energy consumed in disposal equipment for processing the amount of wastes, waste transport vehicles, and waste burial vehicles is received and an environmental load is calculated based on the above information.

The assessment result analysis unit of the simple assessment module is configured to integrally summarize and analyze an environmental load calculation result obtained by the construction stage assessment unit, the operation/management stage assessment unit, and the demolition/disposal stage assessment unit and to provide an environmental load assessment result. The environmental load assessment result provided by the assessment result analysis unit may be diagrammed in the form of various graphs through the UI server, as shown in FIG. 4I.

FIGS. 5A to 5I are diagrams showing an overview of the detailed assessment module and execution screens thereof in the management server according to the construction diagram of FIG. 2. The detailed assessment module may be accessed through the 'Detailed Assessment ('상세평가')' menu created by the project creation module as in FIG. 3B.

The detailed assessment module is implemented to operate in conjunction with the DB server and the project creation module and to assess an environmental load of a target assessment construction project according to the detailed assessment model. The detailed assessment module in detail assesses an environmental load on the basis of detailed material calculation for a start design plan of a target assessment construction project. That is, the detailed assessment module is implemented to in detail assess an environmental load of a building during the life cycle in the start stage. The environmental load assessed by the detailed assessment module is used in a site construction plan of a construction project and a building operation and management plan. The detailed assessment module may be configured to include a start information setting unit, a construction stage assessment unit, an operation/management stage assessment unit, a demolition/disposal stage assessment unit, and an assessment result analysis unit. The above elements are generally the same as those of the above-described simple assessment module except that an environmental load is calculated on the basis of detailed material calculation. In other words, the start information setting unit receives start design information about a target assessment construction project in the project start stage and calculates an environmental load on the basis of the amount of calculated detailed materials.

FIGS. 5B and 5C are execution screens in which start design information is set by the start information setting unit of the detailed assessment module. The start information setting unit may be implemented to operate in conjunction with the design information setting unit of the simple assessment module, to receive planning design information, and to have the planning design information modified. The start information setting unit may receive modified information of the planning design information as the start design information.

FIGS. 5D and 5E show execution screens in which an environmental load in the construction stage is calculated by the construction stage assessment unit of the detailed assessment module. As shown, the detailed amount of construction materials is received for each construction sector and for each process, an environmental load in the production stage of the construction materials is calculated, energy consumption for the transport of the materials transport and the operation of construction equipment is received, and an environmental load according to the use of an energy source is calculated. In FIGS. 5D and 5E, when information calculated based on common material information and environmental load information is received as a 'Standard (표준)' value through the 'Production Stage (생산단계)' menu and 'Working Stage (시공단계)' menu and information determined by the assessor is received as an 'Assessment (평가)' value, an environmental load of a relevant target assessment construction project is calculated as the 'Standard (표준)' value and the 'Assessment (평가)' value. Furthermore, items may be added through a 'Material Addition (자재추가)' key or an 'Energy Source Addition (에너지원추가)' key, and the 'Standard (표준)' value may be copied as the 'Assessment (평가)' value through a 'Amount Copy (물량복사)' key.

FIGS. 5F and 5G show execution screens in which the operation/management stage assessment unit of the detailed assessment module calculates an environmental load in the operation/management stage. As shown, energy consumption for a building operation is received according to a calculation method (e.g., a direct input method, an estimation model method, or an building energy efficiency rating method), an environmental load is calculated based on the energy consumption, the detailed amount of materials for the maintenance and management of a building is received, and an environmental load is calculated based on the detailed amount of materials. The operation/management stage assessment unit of FIGS. 5F and 5G are implemented to calculate the environmental load as a 'Standard (표준)' value and an 'Assessment (평가)' value, like the construction stage assessment unit of FIGS. 5D and 5E.

Figure 5I:
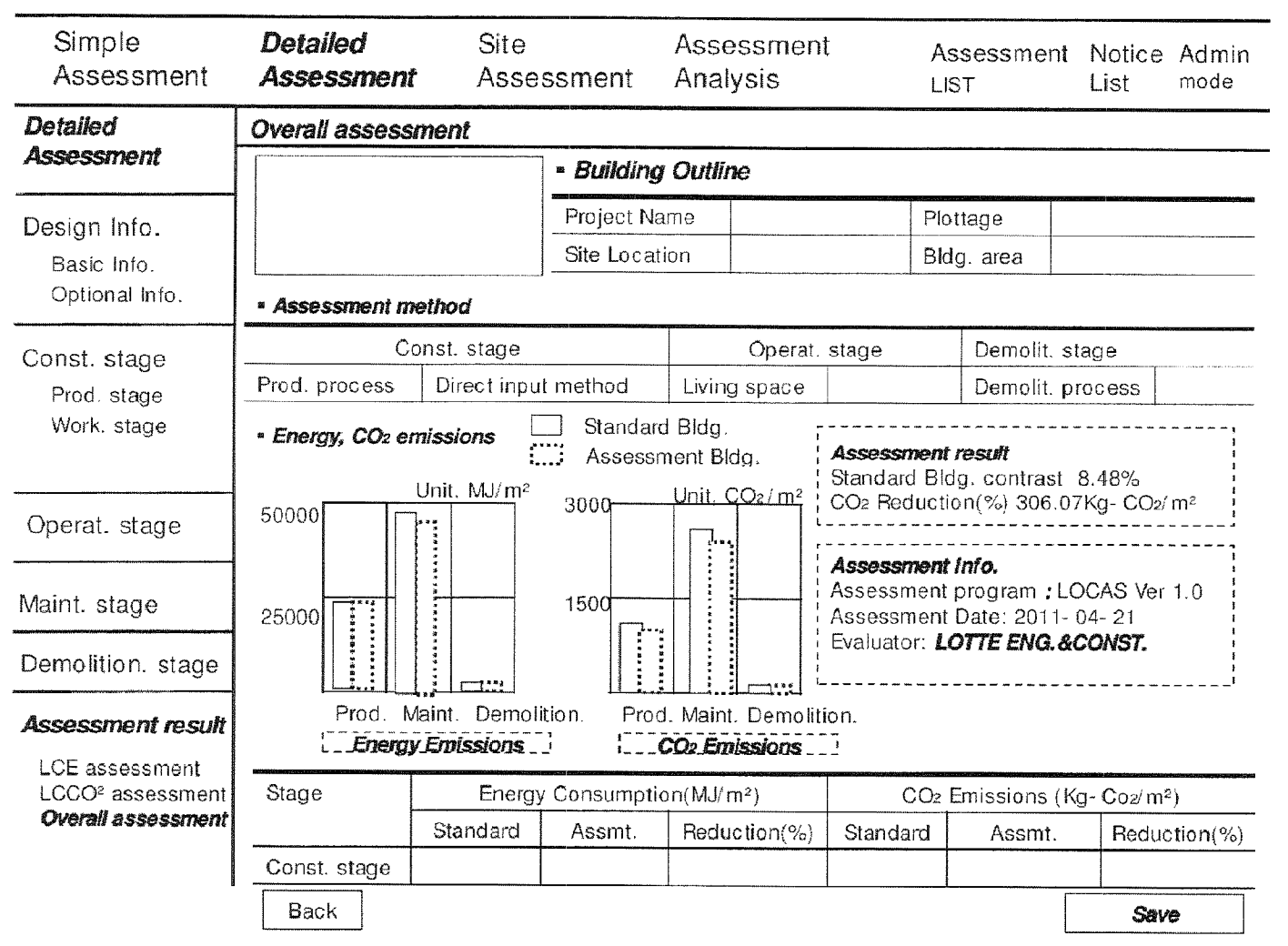

FIG. 5H shows an execution screen in which the demolition/disposal stage assessment unit calculates an environmental load in the demolition/assessment stage through the detailed assessment module. FIG. 5I shows an execution screen in which the assessment result analysis unit is executed in the detailed assessment module. This is the same as FIGS. 4H and 4I.

FIGS. 6A to 6G are screens showing an overview of the site assessment module and execution screens thereof in the management server according to the construction diagram of FIG. 2. The site assessment module, as shown in FIG. 3B, may be accessed through the 'Site Assessment (현장평가)' menu created by the project creation module.

The site assessment module is implemented to operate in conjunction with the DB server and the project creation module, to assess an environmental load of a target assessment construction project according to the site assessment model, and to assess an environmental load on the spot on the basis of site material calculation. The environmental load assessed by the site assessment module is used as basic data for assessing an environmental load of other construction projects. The site assessment module may be configured to include a site information setting unit, an assessment history creation unit, a site construction stage assessment unit, and an assessment result analysis unit. The elements of the site assessment module may be said to correspond to the start information setting unit, the construction stage assessment unit, and the assessment result analysis unit of the detailed assessment module.

The site information setting unit of the site assessment module is implemented to receive site construction information in the project site construction stage and environmental load plan information in the site construction stage in relation to a target assessment construction project. The site information setting unit, as in FIG. 6B, is implemented to operate in conjunction with the start information setting unit of the detailed assessment module, to receive start design information, and to have the start design information modified. Accordingly, the site information setting unit is implemented to receive modified data of the start design information as site construction information and to receive calculated data while operating in conjunction with the construction stage assessment unit of the detailed assessment module. Accordingly, the site information setting unit can receive the modified data of calculated data as environmental load plan information.

Figure 6A:
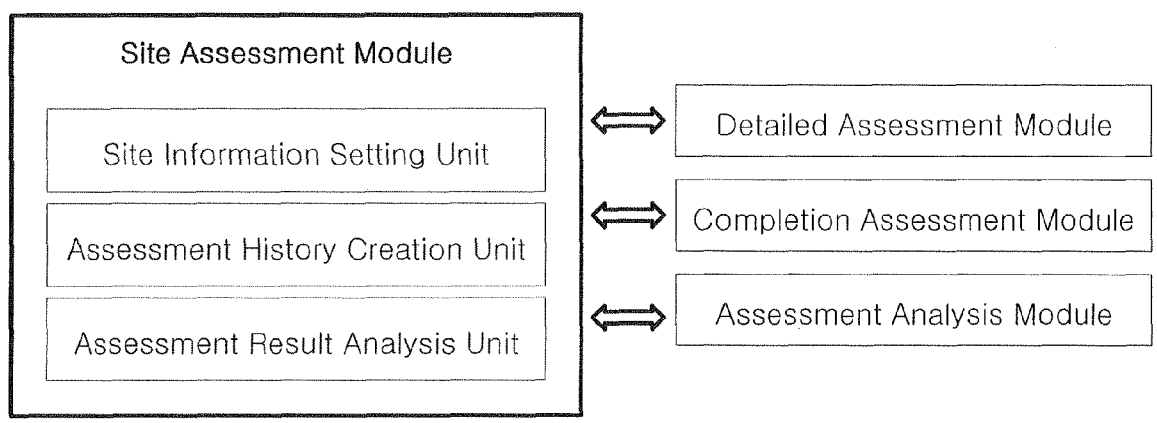
Figure 6C:
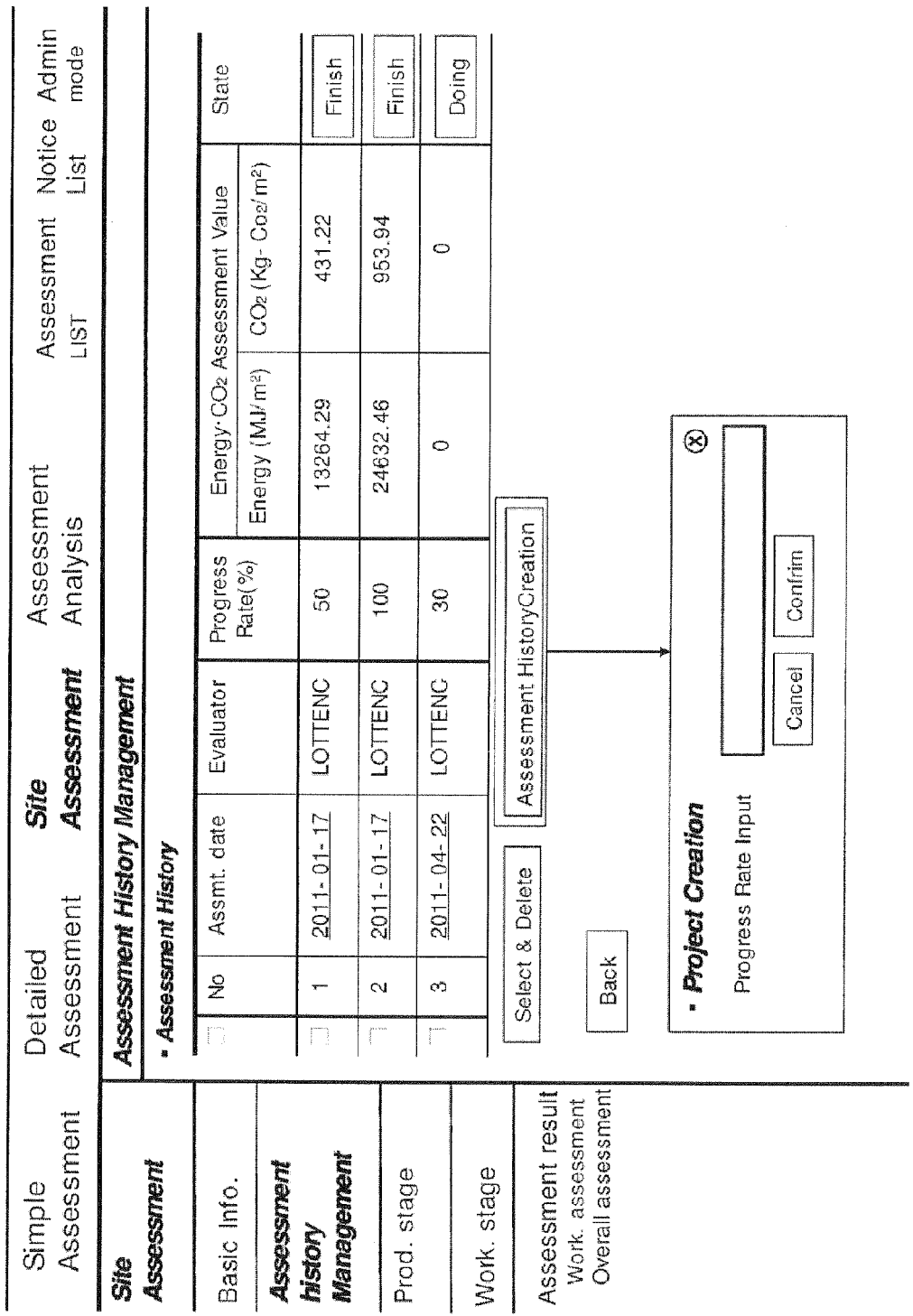

The assessment history creation unit of the site assessment module is implemented to generate an environmental load site assessment model according to the progress percent of a target assessment construction project. FIG. 6C shows a screen in which the progress percent is inputted in a window created by an 'Assessment History Creation (평가내역생성)' key in an 'Assessment History Management (평가내역관리)' menu. The assessment history creation unit is configured to generate a site assessment model according to the progress percent for daily assessment while operating in conjunction with the construction stage assessment unit of the detailed assessment module and, when an assessment date is clicked on, to access the site construction stage assessment unit. Furthermore, an environmental load assessment history according to the progress percent for daily assessment is managed in the 'Assessment History Management (평가내역관리)' menu.

The site construction stage assessment unit of the site assessment module is implemented to operate in conjunction with the assessment history creation unit and to assess an environmental load of a target assessment construction project according to the progress percent in the building site construction stage. The site construction stage assessment unit receives the detailed amount of materials used according to the progress percent, calculates an environmental load of a target assessment construction project according to the progress percent on the basis of the detailed amount of materials, and calculates an environmental load by comparing the calculated environmental load with the environmental load calculated by the construction stage assessment unit of the detailed assessment module.

FIG. 6D shows a screen in which, when the assessment date is clicked from the assessment history items in FIG. 6C, the 'Production Stage (생산단계)' menu is accessed and the site construction stage assessment unit is executed. In FIG. 6D, when the 'Assessment (평가)' value for each construction and for each construction sector, calculated by the construction stage assessment unit of the detailed assessment module, is automatically received as a 'Plan (계획)' value and the amount of material used in an actual site is received as a 'Practical Amount (실시)', an environmental load in the construction material production stage for a relevant progress percent is calculated. Furthermore, after an environmental load according to the production of used construction materials is calculated, the 'Working Stage (시공단계)' menu of FIG. 6E is accessed, detailed energy consumption according to site construction conditions, such as the transport of materials, used equipment, a field office, and new generation energy, is received, and an environmental load is calculated based on the detailed energy consumption. Accordingly, a site assessment work can be performed by taking the actual amount of materials used and the ratio of use according to the progress percent.

The assessment result analysis unit of the site assessment module, as shown in FIGS. 6F and 6E, integrally analyzes an environmental load calculation result calculated by the site construction stage assessment unit and provides an environmental load assessment result. FIG. 6F is a screen showing an assessment result according to the progress percent, and FIG. 6E is a screen showing an assessment result when the progress percent 100% has been achieved and a site construction of a construction project has been finally completed.

Figure 7:
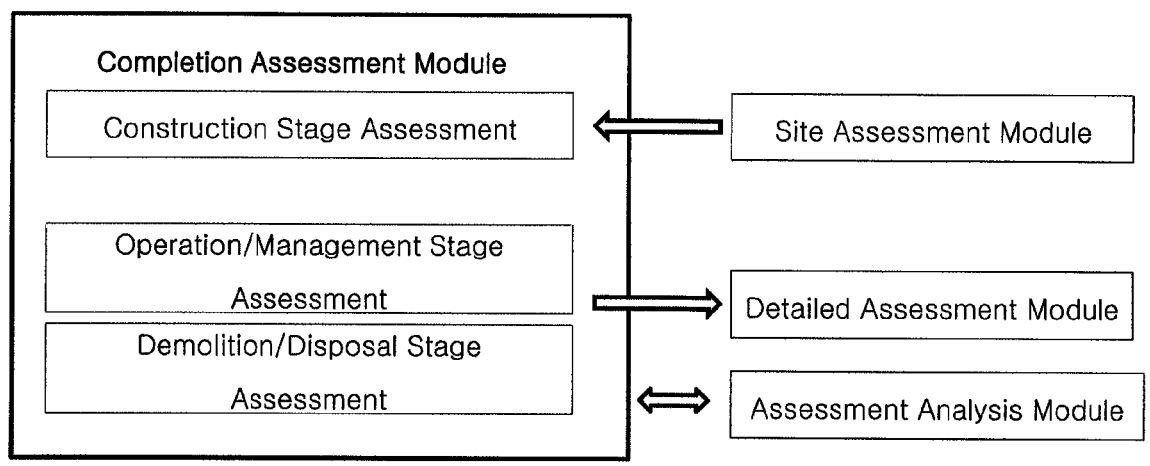
FIG. 7 is a diagram showing an overview of a completion assessment module in the management server according to the construction diagram of FIG. 2.
Figure 8A:
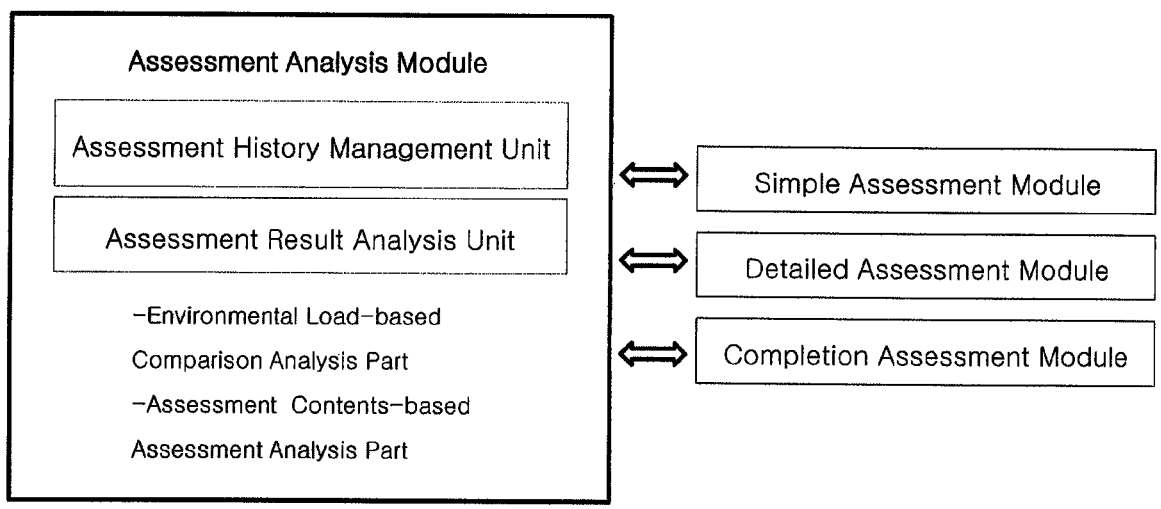

FIG. 7 is a diagram showing an overview of the completion assessment module in the management server according to the construction diagram of FIG. 2. The completion assessment module, as shown in FIG. 3B, may be accessed through the 'Completion Assessment (준공평가)' menu created by the project creation module.

The completion assessment module is implemented to operate in conjunction with the project creation module and the site assessment module and to assess an environmental load of a target assessment construction project according to the completion assessment model. The completion assessment module is implemented to receive a calculation result when the progress percent is 100% through the site construction stage assessment unit of the site assessment module. However, such completion assessment is site assessment when the progress percent 100%, but can be made even after an assessment work of the progress percent 100% is performed by the site construction stage assessment unit of the site assessment module. Accordingly, the completion assessment module may be simply implemented in such a way as to access the execution screen (corresponds to FIG. 6D) of the site construction stage assessment unit when the progress percent is 100%. Furthermore, the completion assessment module may be implemented to operate in conjunction with the detailed assessment module and to receive calculated data through the operation/management stage assessment unit and demolition/disposal stage assessment unit of the detailed assessment module. Accordingly, the completion assessment module can simultaneously manage an actually measured assessment result for an environmental load in the construction process and a predicted assessment result for an environmental load in the operation/management process and for an environmental load in the demolition/disposal process in relation to a completed construction project.

FIGS. 8A to 8H are diagrams showing an overview of the assessment analysis module and execution screens thereof in the management server according to the construction diagram of FIG. 2.

The assessment analysis module is implemented to operate in conjunction with the project creation module, the simple assessment module, the detailed assessment module, and the completion assessment module and to integrally summarize and analyze an assessment result assessed for each target assessment construction project. Data analyzed by the assessment analysis module is used as basic data when assessing an environmental load of a new construction project. The assessment analysis module may be configured to include an assessment history management unit and an assessment result analysis unit.

The assessment history Management unit of the assessment analysis module is configured to summarize and manage a target assessment construction projects history created through the project creation module and also to integrate and manage assessment results assessed for each target assessment construction project through the simple assessment module, the detailed assessment module and the completion assessment module. The assessment history Management unit becomes a kind of an assessment DB, and it is used as basic data of the assessment result analysis unit. The assessment history Management unit may be executed as in FIG. 8B.

The assessment result analysis unit is configured to extract data managed in the assessment history management unit and to perform analysis for each target assessment construction project. The present invention proposes that the assessment result analysis unit includes an environmental load-based comparison analysis part and an assessment contents-based assessment analysis part. Data analyzed by the assessment result analysis unit is provided to the DB server as material information and environmental load information and may be used as basic data for simple assessment and detailed assessment when assessing other construction projects.

The environmental load-based comparison analysis part is configured to extract data, selected by a user, from data managed in the assessment history management unit and to compare and analyze environmental loads according to the types of the environmental loads. The environmental load-based comparison analysis part may be executed as shown in FIGS. 8C and 8D. FIGS. 8C and 8D are diagrams showing comparison results of energy consumption and $CO_2$ emissions according to assessment models (e.g., simple assessment, detailed assessment, and completion assessment) in relate to one construction project.

The assessment contents-based assessment analysis part is configured to extract data, assessed by the detailed assessment module or the completion assessment module, from data managed in the assessment history management unit and to analyze an environmental load according to assessment contents for each target assessment construction project. The assessment the contents-based assessment analysis part may be executed as shown in FIGS. 8E to 8H. FIG. 8E shows a result in which assessment results of an environmental load, obtained by the detailed assessment module in the construction stage, are summarized and analyzed. FIG. 8F shows a result in which major emission materials of $CO_2$ are extracted, analyzed, and summarized in the assessment results of the environmental load, obtained by the detailed assessment module, in the construction stage. FIG. 8G shows a result in which assessment results of an environmental load obtained by the completion assessment module (they are the same as the assessment results obtained by the site assessment module in the site construction stage) are extracted, analyzed, and summarized. FIG. 8H shows a result in which assessment results of an environmental load, obtained by the detailed assessment module in the operation/management stage, are extracted, analyzed, and summarized.

Furthermore, the management server of the environmental load assessment system according to the present invention is configured to include a user certification module and a system management module. The user certification module and the system management module are constructed in a similar manner to other modules. FIGS. 9A to 9C are diagrams showing execution screens of the system management module in the management server according to the construction diagram of FIG. 2. FIG. 9A shows a screen in which system users are managed. FIG. 9B shows a screen in which target assessment construction projects are managed. FIG. 9C shows a screen in which a DB used as an assessment index is managed.

As described above, the present invention may have the following advantages.

First, a design plan in which an environmental load, together with a feasibility review, is taken into consideration can be induced because an environmental load of a building during the life cycle can be assessed in a planning stage. Furthermore, an environmental load of a planned building is estimated through detailed assessment using a material calculation history document in the start stage of a building, and an environmental load according to an earned value of VE activities and materials in a site are actually measured in the site construction stage of a building. Accordingly, more accurate assessment can be performed for each stage. In addition, since assessment results for stages are compared and analyzed and a DB is constructed using the comparison and analysis results, practical values according to the accumulation of the assessment results can be calculated, and accuracy can be increased. Furthermore, various projects can be assessed and managed through project-based comparison and analysis.

Second, a detailed assessment result and a construction site assessment result can be compared and analyzed based on detailed assessment result data, estimated in the start stage, and energy consumption and material production data actually used in the site construction stage. The analysis results may be utilized as evidence data pertinent to the carbon reduction activities of a construction company in the case where regulations related to Certified Emission Reduction (CER) are put in practice in the future. The analysis results may help earned values and VE activities through real-time monitoring.

Third, user convenience can be improved because the system of the present invention can be constructed and provided on the basis of a web. In particular, the system of the present invention can be utilized as a decision-making tool for efficient assessment and management of an environmental load because assessment staffs can conveniently communicate with each other and newly proposed eco-friendly technological factors can be easily taken into account.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An environmental load assessment system configured to assess an environmental load, including energy consumption and carbon dioxide emissions, of a building during life cycle according to a progress of a construction project, the system comprising:
   one or more user terminals;
   a database (DB) server configured to store material information, environmental load information, itemized material information about a construction work and to store environmental load information about an energy source in the form of energy consumption, wherein the itemized material information includes information on specific kinds of materials and the environmental load information includes information on the actual amount of energy consumed;
   a management server configured to comprise a project creation module implemented to create an assessment model of the construction project for each assessment method, including a simple assessment, which is used during the planning stage of the target assessment construction project, and is based on a simple material calculation, a detailed assessment, which is used during the start design plan stage of the target assessment construction project, and is based on a detailed material calculation and a site assessment based on a site material calculation;
   a simple assessment module implemented to operate in conjunction with the DB server and the project creation module and to assess the environmental load, the environmental load measured by CO2emissions and energy consumption, of the construction project according to the simple assessment model, wherein the simple assessment module of the management server comprises:
      a design information setting unit configured to receive planning design information about the construction project in a project design stage, the planning design information comprising a site location , a regional district, a use, a structure, plottage, a building area, a floor space index, an architectural construction, gross floor area, a new generation energy production plan, and a ground floor design plan;
      a construction stage assessment unit configured to receive a simple amount of materials and energy consumption to be used in a building construction stage of the construction project, based on the planning design information set in the design information setting unit and the various pieces of information stored in the DB server, and to calculate an environmental load in the building construction stage;
      an operation/management stage assessment unit configured to receive energy consumption data for an operation of the building and a simple amount of materials for building maintenance and management which will be used in a building operation/management stage of the construction project, based on the planning design information set in the design information setting unit and the various pieces of information stored in the DB server, and to calculate an environmental load in the building operation/management stage;
      a demolition/disposal stage assessment unit configured to receive an amount of wastes to be discharged and energy consumption to be used in a building demolition/disposal stage of the construction project, based on the planning design information set in the design information setting unit and the various pieces of information stored in the DB server, and to calculate an environmental load in the building demolition/disposal stage;

a detailed assessment module implemented to operate in conjunction with the DB server and the project creation module and to assess the environmental load, the environmental load measured by CO2emissions and energy consumption, of the construction project according to the detailed assessment model, wherein the detailed assessment module of the management server comprises:
a start information setting unit configured to receive start design information about the construction project in a project start stage;
a construction stage assessment unit configured to receive a detailed amount of material and energy consumption to be used in the building construction stage of the construction project based on the start design information set in the start information setting unit and the various pieces of information stored in the DB server and to calculate the environmental load in the building construction stage, wherein the detailed amount of materials comprise a detailed amount of construction materials for each construction sector and for each process in the building construction stage;
an operation/management stage assessment unit configured to receive energy consumption for the operation of the building and a detailed amount of materials for the maintenance and management of the building which will be used in the building operation/management stage of the construction project based on the start design information set in the start information setting unit and the various pieces of information stored in the DB server and to calculate the environmental load in the operation/management stage, wherein the detailed amount of materials comprise a detailed amount of construction materials for each construction sector and for each process in the building operation/management stage; and
a demolition/disposal stage assessment unit configured to receive the amount of wastes to be discharged and energy consumption to be used in the building demolition/disposal stage of the construction project based on the start design information set in the start information setting unit and the various pieces of information stored in the DB server and to calculate the environmental load in the demolition/disposal stage, wherein the detailed amount of materials comprise a detailed amount of construction materials for each construction sector and for each process in the building demolition/disposal stage;
and a site assessment module implemented to operate in conjunction with the DB server and the project creation module and to assess the environmental load, the environmental load measured by CO2emissions and energy consumption, of the construction project according to the site assessment model, wherein the site assessment module comprises:
a site information setting unit configured to receive site construction information in a project site construction stage, a detailed amount of materials to be used in the project site construction stage, and environmental load plan information according to energy consumption of the construction project; and
an assessment history creation unit configured to generate a site assessment model according to the progress percent for daily assessment while operating in conjunction with the construction stage assessment unit of the detailed assessment module, and configured, when an assessment date is clicked on, to access the site construction stage assessment unit; and
a site construction state assessment unit configured to receive a detailed amount of materials used according to a progress percent and to calculate an environmental load according to the progress percent and the received detailed amount of materials used;
wherein the site construction state assessment unit is further configured to compare the environmental load calculated by the site construction state assessment unit and the environmental load calculated by the construction stage assessment unit of the detailed assessment module;
a User Interface (UI) server configured to provide the user terminals with an execution environment so that the management server can be operated.

2. The environmental load assessment system as claimed in claim 1, wherein the start information setting unit is configured to operate in conjunction with the design information setting unit of the simple assessment module, receive the planning design information, have the planning design information modified, and receive the modified information as the start design information.

3. The environmental load assessment system as claimed in claim 1, wherein the site information setting unit is configured to operate in conjunction with the start information setting unit of the detailed assessment module, receive the start design information and have the start design information modified by a user if the start design information is modified after the project start stage, and receive the modified data of the start design information as the site construction information or is configured to operate in conjunction with the construction stage assessment unit of the detailed assessment module, receive the calculated data on environment load in the construction stage assessment unit, have the received data modified by the user according to necessity of the user, and receive the modified data as the environmental load plan information.

4. The environmental load assessment system as claimed in claim 1, wherein:
the project creation module of the management server is implemented to further create a completion assessment model in relation to the construction project, and the management server is configured to further comprise a completion assessment module configured to operate in conjunction with the project creation module, the detailed assessment module, and the site assessment module, assess the environmental load of the construction project according to a completion assessment model, receive the data, calculated by the operation/management stage assessment unit and demolition/disposal stage assessment unit of the detailed assessment module, and the data calculated by the site construction stage assessment unit of the site assessment module when the progress percent is 100%, and integrate the received data.

5. The environmental load assessment system as claimed in claim 4, wherein the management server further comprises an assessment analysis module implemented to operate in conjunction with the project creation module, the simple assessment module, the detailed assessment module, and the completion assessment module and integrally analyze the data on the environment load calculated for the construction project using a table or a graph.

6. The environmental load assessment system as claimed in claim 5, wherein the assessment analysis module of the management server comprises:

an assessment history management unit configured to integrally manage data assessed by the simple assessment module, the detailed assessment module, and the completion assessment module for the construction project; and
an assessment result analysis unit configured to extract data managed in the assessment history management unit and analyze the data for the construction project using a table or a graph.

7. The environmental load assessment system as claimed in claim 6, wherein the assessment result analysis unit of the assessment analysis module comprises:
an environmental load-based comparison analysis part configured to extract data on environment load, selected by a user according to the construction projects and the assessment models such as the simple assessment, the detailed assessment, and the completion assessment, from the data managed in the assessment history management unit and compare and analyze environmental loads according to types of environmental loads such as the energy consumptions and the $CO_2$ emissions; and
an assessment contents-based assessment analysis part configured to extract data, assessed by the detailed assessment module or the completion assessment module, from the data managed in the assessment history management unit and analyze an environmental load according to assessment contents for the construction project using a table or a graph.

* * * * *